United States Patent
Sun et al.

(10) Patent No.: US 11,902,403 B2
(45) Date of Patent: Feb. 13, 2024

(54) METHOD FOR RECEIVING CODE BLOCK STREAM, METHOD FOR SENDING CODE BLOCK STREAM, AND COMMUNICATIONS APPARATUS

(71) Applicant: Huawei Technologies Co., Ltd., Shenzhen (CN)

(72) Inventors: Desheng Sun, Shenzhen (CN); Qichang Chen, Shenzhen (CN); Qiwen Zhong, Shenzhen (CN); Lehong Niu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 217 days.

(21) Appl. No.: 17/168,502

(22) Filed: Feb. 5, 2021

(65) Prior Publication Data

US 2021/0160346 A1    May 27, 2021

Related U.S. Application Data

(63) Continuation of application No. PCT/CN2019/099111, filed on Aug. 2, 2019.

(30) Foreign Application Priority Data

Aug. 7, 2018  (CN) .......................... 201810893109.0

(51) Int. Cl.
    *H04L 29/06*    (2006.01)
    *H04L 69/08*    (2022.01)
    (Continued)

(52) U.S. Cl.
    CPC ............ *H04L 69/08* (2013.01); *H04L 1/0057* (2013.01); *H04L 45/741* (2013.01)

(58) Field of Classification Search
    CPC ............ H04J 2203/0085; H04J 3/1658; H04L 1/0057; H04L 45/741; H04L 69/08
    See application file for complete search history.

(56) References Cited

U.S. PATENT DOCUMENTS

| 9,088,403 B1 | 7/2015 | Caggioni et al. |
| 9,294,418 B2 | 3/2016 | Hoyer et al. |

(Continued)

FOREIGN PATENT DOCUMENTS

| CN | 101399823 A | 4/2009 |
| CN | 101692633 A | 4/2010 |

(Continued)

OTHER PUBLICATIONS

IEEE Std 802.3-2015, IEEE Standard for Ethernet. Section1, 628 pages.

(Continued)

*Primary Examiner* — Mansour Oveissi
*Assistant Examiner* — David M Oveissi
(74) *Attorney, Agent, or Firm* — Conley Rose, P.C.

(57) ABSTRACT

A method includes receiving, by a receiving device from a transport network, a code block stream that is in a first rate mode and that includes a plurality of code blocks, determining a target code block from the code block stream, where the target code block is a code block received by the receiving device in an inter-packet gap of the code block stream, the target code block includes a first target code block, and the first target code block is a code block of a data type, and/or the target code block includes a second target code block, and the second target code block is a code block of a termination type, and modifying the target code block to modify the target code block to a code block, of an ordered set type, that is in a second rate mode.

20 Claims, 14 Drawing Sheets

(51) Int. Cl.
H04L 1/00 (2006.01)
H04L 45/741 (2022.01)

(56) References Cited

U.S. PATENT DOCUMENTS

| | | | | |
|---|---|---|---|---|
| 2009/0190595 A1* | 7/2009 | Jiang | ............ | H04L 25/4908 370/395.1 |
| 2010/0080248 A1* | 4/2010 | Aweya | ............ | H04J 3/0697 370/503 |
| 2016/0013922 A1 | 1/2016 | Su et al. | | |
| 2016/0020872 A1* | 1/2016 | Zhong | ............ | H04L 1/0083 341/87 |
| 2019/0190690 A1 | 6/2019 | Zhong et al. | | |
| 2019/0190829 A1 | 6/2019 | Zhong et al. | | |
| 2019/0288783 A1 | 9/2019 | Zhong | | |
| 2020/0396097 A1* | 12/2020 | Deng | ............ | H04L 69/22 |

FOREIGN PATENT DOCUMENTS

| | | |
|---|---|---|
| CN | 104185976 A | 12/2014 |
| CN | 107786299 A | 3/2018 |
| CN | 108242969 A | 7/2018 |
| JP | 2009135767 A | 6/2009 |
| WO | 2018036482 A1 | 3/2018 |
| WO | 2018036485 A1 | 3/2018 |
| WO | 2018080566 A1 | 5/2018 |

OTHER PUBLICATIONS

IEEE Std 802.3-2015, IEEE Standard for Ethernet. Section Two, 761 pages.
IEEE Std 802.3-2015, IEEE Standard for Ethernet. Section Three, 346 pages.
IEEE Std 802.3-2015, IEEE Standard for Ethernet. Section Four, 748 pages.
IEEE Std 802.3-2015, IEEE Standard for Ethernet. Section Five, 835 pages.
IEEE Std 802.3-2015, IEEE Standard for Ethernet. Section Six, 699 pages.
IA OIF-FLEXE-01.1. Flex Ethernet Implementation Agreement, Jun. 21, 2017, 35 pages.
IA OIF-FLEXE-01.0, Flex Ethernet Implementation Agreement. Mar. 2016, 31 pages.
IA OIF-FLEXE-02.0, Flex Ethernet 2.0 Implementation Agreement. Jun. 22, 2018, 51 pages.
Chen, Q., et al., "Towards an Unified Multi-service Ethernet Transport Network (ETN)," 2018 28th International Telecommunication Networks and Applications Conference (ITNAC), Nov. 21-23, 2018, 6 pages.

* cited by examiner

| Input data | Synchronization header | Code block payload | | | | | | | |
|---|---|---|---|---|---|---|---|---|---|
| Bit location / Data code block format | 01 | 2 | | | | | | | 65 |
| $D_0D_1D_2D_3/D_4D_5D_6D_7$ | 01 | $D_0$ | $D_1$ | $D_2$ | $D_3$ | $D_4$ | $D_5$ | $D_6$ | $D_7$ |
| Control code block format | | Code block type | | | | | | | |
| $C_0C_1C_2C_3/C_4C_5C_6C_7$ | 10 | 0x1e | $C_0$ | $C_1$ | $C_2$ | $C_3$ | $C_4$ | $C_5$ | $C_6$ | $C_7$ |
| $C_0C_1C_2C_3/O_4D_5D_6D_7$ | 10 | 0x2d | $C_0$ | $C_1$ | $C_2$ | $C_3$ | $O_4$ | $D_5$ | $D_6$ | $D_7$ |
| $C_0C_1C_2C_3/S_4D_5D_6D_7$ | 10 | 0x33 | $C_0$ | $C_1$ | $C_2$ | $C_3$ | | $D_5$ | $D_6$ | $D_7$ |
| $O_0D_1D_2D_3/S_4D_5D_6D_7$ | 10 | 0x66 | $D_1$ | $D_2$ | $D_3$ | $O_0$ | | $D_5$ | $D_6$ | $D_7$ |
| $O_0D_1D_2D_3/O_4D_5D_6D_7$ | 10 | 0x55 | $D_1$ | $D_2$ | $D_3$ | $O_0$ | $O_4$ | $D_5$ | $D_6$ | $D_7$ |
| $S_0D_1D_2D_3/D_4D_5D_6D_7$ | 10 | 0x78 | $D_1$ | $D_2$ | $D_3$ | $D_4$ | | $D_5$ | $D_6$ | $D_7$ |
| $O_0D_1D_2D_3/C_4C_5C_6C_7$ | 10 | 0x4b | $D_1$ | $D_2$ | $D_3$ | $O_0$ | $C_4$ | $C_5$ | $C_6$ | $C_7$ |
| $T_0C_1C_2C_3/C_4C_5C_6C_7$ | 10 | 0x87 | | $C_1$ | $C_2$ | $C_3$ | $C_4$ | $C_5$ | $C_6$ | $C_7$ |
| $D_0T_1C_2C_3/C_4C_5C_6C_7$ | 10 | 0x99 | $D_0$ | | $C_2$ | $C_3$ | $C_4$ | $C_5$ | $C_6$ | $C_7$ |
| $D_0D_1T_2C_3/C_4C_5C_6C_7$ | 10 | 0xaa | $D_0$ | $D_1$ | | $C_3$ | $C_4$ | $C_5$ | $C_6$ | $C_7$ |
| $D_0D_1D_2T_3/C_4C_5C_6C_7$ | 10 | 0xb4 | $D_0$ | $D_1$ | $D_2$ | | $C_4$ | $C_5$ | $C_6$ | $C_7$ |
| $D_0D_1D_2D_3/T_4C_5C_6C_7$ | 10 | 0xcc | $D_0$ | $D_1$ | $D_2$ | $D_3$ | | $C_5$ | $C_6$ | $C_7$ |
| $D_0D_1D_2D_3/D_4T_5C_6C_7$ | 10 | 0xd2 | $D_0$ | $D_1$ | $D_2$ | $D_3$ | $D_4$ | | $C_6$ | $C_7$ |
| $D_0D_1D_2D_3/D_4D_5T_6C_7$ | 10 | 0xe1 | $D_0$ | $D_1$ | $D_2$ | $D_3$ | $D_4$ | $D_5$ | | $C_7$ |
| $D_0D_1D_2D_3/D_4D_5D_6T_7$ | 10 | 0xff | $D_0$ | $D_1$ | $D_2$ | $D_3$ | $D_4$ | $D_5$ | $D_6$ | |

FIG. 3

| Input data | Synchronization header | Code block payload | | | | | | | |
|---|---|---|---|---|---|---|---|---|---|
| Bit location / Data code block format | 01 | 2 | | | | | | | 65 |
| $D_0D_1D_2D_3D_4D_5D_6D_7$ | 01 | $D_0$ | $D_1$ | $D_2$ | $D_3$ | $D_4$ | $D_5$ | $D_6$ | $D_7$ |
| Control code block format | | Code block type | | | | | | | |
| $C_0C_1C_2C_3C_4C_5C_6C_7$ | 10 | 0x1E | $C_0$ | $C_1$ | $C_2$ | $C_3$ | $C_4$ | $C_5$ | $C_6$ | $C_7$ |
| $S_0D_1D_2D_3D_4D_5D_6D_7$ | 10 | 0x78 | $D_1$ | $D_2$ | $D_3$ | $D_4$ | $D_5$ | $D_6$ | $D_7$ |
| $O_0D_1D_2D_3Z_4Z_5Z_6Z_7$ | 10 | 0x4B | $D_1$ | $D_2$ | $D_3$ | $O_0$ | 0x000_0000 | | |
| $T_0C_1C_2C_3C_4C_5C_6C_7$ | 10 | 0x87 | | $C_1$ | $C_2$ | $C_3$ | $C_4$ | $C_5$ | $C_6$ | $C_7$ |
| $D_0T_1C_2C_3C_4C_5C_6C_7$ | 10 | 0x99 | $D_0$ | | $C_2$ | $C_3$ | $C_4$ | $C_5$ | $C_6$ | $C_7$ |
| $D_0D_1T_2C_3C_4C_5C_6C_7$ | 10 | 0xAA | $D_0$ | $D_1$ | | $C_3$ | $C_4$ | $C_5$ | $C_6$ | $C_7$ |
| $D_0D_1D_2T_3C_4C_5C_6C_7$ | 10 | 0xB4 | $D_0$ | $D_1$ | $D_2$ | | $C_4$ | $C_5$ | $C_6$ | $C_7$ |
| $D_0D_1D_2D_3T_4C_5C_6C_7$ | 10 | 0xCC | $D_0$ | $D_1$ | $D_2$ | $D_3$ | | $C_5$ | $C_6$ | $C_7$ |
| $D_0D_1D_2D_3D_4T_5C_6C_7$ | 10 | 0xD2 | $D_0$ | $D_1$ | $D_2$ | $D_3$ | $D_4$ | | $C_6$ | $C_7$ |
| $D_0D_1D_2D_3D_4D_5T_6C_7$ | 10 | 0xE1 | $D_0$ | $D_1$ | $D_2$ | $D_3$ | $D_4$ | $D_5$ | | $C_7$ |
| $D_0D_1D_2D_3D_4D_5D_6T_7$ | 10 | 0xFF | $D_0$ | $D_1$ | $D_2$ | $D_3$ | $D_4$ | $D_5$ | $D_6$ | |

FIG. 5

METHOD FOR RECEIVING CODE BLOCK STREAM, METHOD FOR SENDING CODE BLOCK STREAM, AND COMMUNICATIONS APPARATUS

CROSS-REFERENCE TO RELATED APPLICATIONS

This application is a continuation of International Patent Application No. PCT/CN2019/099111 filed on Aug. 2, 2019, which claims priority to Chinese Patent Application No. 201810893109.0 filed on Aug. 7, 2018, both of which are hereby incorporated by reference in their entireties.

TECHNICAL FIELD

Embodiments of this application relate to the communications field, and more specifically, to a method for receiving a code block stream, a method for sending a code block stream, and a communications apparatus.

BACKGROUND

Ethernet technologies are widely applied in the network industry, and the Ethernet technologies are greatly popular with network vendor due to a concise and best-effort transmission mode and a standardized interconnection mechanism. Currently, the Ethernet technologies have been developed to a Flexible Ethernet (FlexE) 1.0 implementation protocol based on a 100 Gigabit Ethernet standard. Rate aggregation of the FlexE supports a case in which high-speed Ethernet service data streams are carried together by using a plurality of low-rate physical interfaces, and a subrate and channelization allow a case in which a plurality of low-rate data streams are concurrently carried within one Ethernet physical interface. A large quantity of network devices that support an Ethernet interface are deployed in an access network and a metropolitan area network in existing networks. A FlexE interface is compatible with a standard Ethernet and extends a function and flexibility of the Ethernet, and has a good market application prospect and development in a scenario with a deterministic low latency and high bandwidth such as a fronthaul network and a backhaul network in a fifth generation (5th generation, 5G) system and a data center interconnection.

A transmission speed of the FlexE may be in a unit of gigabit per second (Gbps). Currently, a client signal in the FlexE may include the following modes an Ethernet physical interface mode supporting a 5 Gbps rate (5 Gbps base range, 5G BASE-R), an Ethernet physical interface mode supporting a 10 Gbps rate (10 Gbps base range, 10G BASE-R), and an Ethernet physical interface mode supporting a 25 Gbps rate (25 Gbps base range, nx25G BASE-R).

The client signal needs to be forwarded by using a transport network of the Ethernet. The transport network of the Ethernet may use, for example, an Ethernet physical interface mode supporting a 100 Gbps rate (100 Gbps base range, 100G BASE-R), an Ethernet physical interface mode supporting a 200 Gbps rate (200 Gbps base range, 200G BASE-R), and an Ethernet physical interface mode supporting a 400 Gbps rate (400 Gbps base range, 400G BASE-R).

Some code blocks (for example, a 0x2d type code block or a 0x55 type code block) of an ordered set type in modes such as the 5G BASE-R, the 10G BASE-R, or the 25G BASE-R do not exist in the 100G BASE-R, the 200G BASE-R, the 400G BASE-R, and a mode with a higher rate. Therefore, the code blocks of the ordered set type cannot be transmitted by using a transport network based on an interface with a 100G or higher rate. This affects communication accuracy.

SUMMARY

This application provides a method for sending and receiving a code block stream, a method for sending a code block stream, and a communications apparatus, to ensure transmission of a control code block and improve communication accuracy.

According to a first aspect, a method for receiving a code block stream is provided, including receiving, by a receiving device from a transport network, a code block stream that is in a first rate mode and that includes a plurality of code blocks, determining, by the receiving device, a target code block from the code block stream, where the target code block is a code block received by the receiving device in an inter-packet gap of the code block stream, the target code block includes a first target code block, and the first target code block is a code block of a data type, and/or the target code block includes a second target code block, and the second target code block is a code block of a termination type, and modifying, by the receiving device, the target code block to modify the target code block to a code block, of an ordered set type, that is in a second rate mode.

The target code block is a code block generated after a sending device of the code block stream in the first rate mode modifies the code block of the ordered set type in the received code block stream that is in the second rate mode and that is from a client device.

Because the code block of the ordered set type is transmitted in the inter-packet gap, the sending device may modify the code block of the ordered set type to the code block of the data type or the code block of the termination type that can be recognized by the transport network. In this way, the receiving device can determine that the code block of the data type or the code block of the termination type that is located in the inter-packet gap is modified based on the code block of the ordered set type, and may further modify the code block of the data type or the code block of the termination type that is located in the inter-packet gap back to the code block of the ordered set type. This can not only ensure that the code block of the ordered set type can be transmitted by using the transport network, but also ensure that the receiving device reliably recognizes the code block of the ordered set type, thereby improving communication accuracy.

In this application, the code block stream in the first rate mode may be a code block stream (or a bit code block stream or a bit stream) that is processed (for example, encoded or decoded) at a physical coding sublayer (PCS) and that is in an Ethernet signal (for example, a high-speed Ethernet signal) transmitted in the transport network (for example, a network supporting a FlexE).

In addition, the code block stream in the second rate mode may be a code block stream (or a bit code block stream or a bit stream) that is processed at the PCS and that is in an Ethernet signal (for example, a medium-low-speed Ethernet signal) transmitted before the client device and a transport device (for example, an ingress device or an egress device of the transport network).

In addition, the code block stream that is in the first rate mode and that is sent by the sending device may be generated after the sending device performs processing such as transcoding on the code block stream in the second rate mode.

The receiving device may be an egress device for the code block stream in the first rate mode (or an Ethernet signal including the code block stream in the first rate mode) in the transport network. To be specific, the Ethernet signal flows from the transport network to a destination network (including a destination client device of the Ethernet signal) of the Ethernet signal by using the egress device.

The sending device may be an ingress device for the code block stream in the first rate mode (or the Ethernet signal including the code block stream in the first rate mode) in the transport network. To be specific, the Ethernet signal flows from a source network (including a source client device of the Ethernet signal) of the Ethernet signal to the transport network by using the ingress device.

In this application, a rate corresponding to the second rate mode is less than or equal to a rate corresponding to the first rate mode.

"A rate corresponding to the second rate mode is less than or equal to a rate corresponding to the first rate mode" may be understood as a case in which a signal that is in the first rate mode and that is used as a signal in a high-speed mode may be obtained by aggregation of one or more signals that are in a low-speed mode and that include a signal in the second rate mode.

Alternatively, "a rate corresponding to the second rate mode is less than or equal to a rate corresponding to the first rate mode" may be understood as a case in which a quantity of slots that can be included by a signal in the first rate mode is greater than a quantity of slots that can be included in a signal in the second rate mode.

As an example instead of a limitation, the first rate mode may include a 40G BASE-R mode, a 100G BASE-R mode, a 200G BASE-R mode, or a 400G BASE-R mode.

Alternatively, the transport network may include an Ethernet physical link in a 40G BASE-R mode, a 100G BASE-R mode, a 200G BASE-R mode, or a 400G BASE-R mode, or the transport network may support an Ethernet physical interface mode with a rate of 40 Gbps, 100 Gbps, 200 Gbps, or 400 Gbps.

Alternatively, a transport device in the transport network forwards an Ethernet signal based on a 40G BASE-R mode, a 100G BASE-R mode, a 200G BASE-R mode, or a 400G BASE-R mode.

A transmission quantity of the code block stream (or an Ethernet signal including the code block stream in the first rate mode) in the first rate mode may be 40 Gbps, 100 Gbps, 200 Gbps, or 400 Gbps.

Alternatively, the Ethernet signal including the code block stream in the first rate mode may be an Ethernet signal in the 40G BASE-R mode, an Ethernet signal in the 100G BASE-R mode, an Ethernet signal in the 200G BASE-R mode, or an Ethernet signal in the 400G BASE-R mode.

As an example instead of a limitation, the second rate mode may include a 5G BASE-R mode, a 10G BASE-R mode, or a 25G BASE-R mode.

Alternatively, a link between the client device and the ingress device or the egress device of the transport network may include an Ethernet physical link in a 5G BASE-R mode, a 10G BASE-R mode, or a 25G BASE-R mode, or the client device may support an Ethernet physical interface mode with a rate of 5 Gbps, 10 Gbps, or 25 Gbps.

Alternatively, an Ethernet signal is forwarded between the client device and the ingress device or the egress device of the transport network based on the 5G BASE-R mode, the 10G BASE-R mode, or the 25G BASE-R mode.

A transmission quantity of the code block stream (or an Ethernet signal including the code block stream in the second rate mode) in the second rate mode may be 5 Gbps, 10 Gbps, or 25 Gbps.

Alternatively, the Ethernet signal including the code block stream in the second rate mode may be a signal in the 5G BASE-R mode, a signal in the 10G BASE-R mode, or a signal in the 25G BASE-R mode.

Optionally, the code block in the code block stream may be a 64-bit (b) code block, or the code block in the code block stream may be a 66b code block.

The code block of the ordered set type may also be referred to as an ordered set (O) code block.

For example, the O code block may include a code block in which information carried in a code block type field is 0x2d.

For another example, the O code block may include a code block in which information carried in a code block type field is 0x55.

A bit carried in a synchronization header field of the O code block is 10.

The bit "10" may be understood as a binary bit or a value "10". To avoid repetition, descriptions of same or detailed cases are omitted below.

Optionally, the modifying, by the receiving device, the target code block includes modifying, by the receiving device, information carried in a code block type field of the second target code block to code block type information corresponding to the ordered set type.

For example, the target (T) code block may include a code block in which information carried in a code block type field is at least one of the following information:

0x87, 0x99, 0xAA, 0xB4, 0xCC, 0xD2, 0xE1, and 0xFF.

To be specific, the modifying, by the receiving device, information carried in a code block type field of the target code block includes modifying, by the receiving device, the information carried in the code block type field of the second target code block from one of 0x87, 0x99, 0xAA, 0xB4, 0xCC, 0xD2, 0xE1, and 0xFF to 0x2d or 0x55.

Optionally, the modifying, by the receiving device, information carried in a code block type field of the second target code block to code block type information corresponding to the ordered set type includes modifying, by the receiving device based on a mapping relationship, information carried in a code block type field of a second target code block of a first termination type to information corresponding to a first ordered set type, where the mapping relationship is used to indicate a one-to-one mapping relationship between at least two termination types and at least two ordered set types, the first ordered set type corresponds to the first termination type, and the first termination type is any one of the at least two termination types.

Optionally, the modifying, by the receiving device, information carried in a code block type field of the second target code block to code block type information corresponding to the ordered set type includes determining, by the receiving device, a one-to-one mapping relationship between code blocks of at least two termination types and code blocks of at least two ordered set types, and when the second target code block is a code block of a first termination type, modifying, by the receiving device based on the mapping relationship, the information carried in the code block type field of the target code block to information corresponding to a code block of a first ordered set type, where the code block of the first ordered set type is a code block of an ordered set type that corresponds to the code block of the first termination type as indicated by the mapping relationship, and the code block of the first termination type is any one of the code blocks of the at least two termination types.

For example, the O code block in which the information carried in the code block type field is 0x2d may correspond to a T code block in which information carried in a code block type field is 0xE1.

For another example, the O code block in which the information carried in the code block type field is 0x55 may correspond to a T code block in which information carried in a code block type field is 0xFF.

In addition, a bit carried in a synchronization header field of the T code block is 10.

The modifying, by the receiving device, the target code block includes modifying, by the receiving device, information carried in a synchronization header field of the first target code block to synchronization header information corresponding to the ordered set type.

The code block of the data type may also be referred to as a data (D) code block.

In this case, optionally, to be specific, the modifying, by the receiving device, information carried in a code block type field of the target code block includes modifying, by the receiving device, the information carried in the code block type field of the first target code block from 01 to 10.

A bit carried in a synchronization header field of the D code block is 01.

To be specific, the modifying, by the receiving device, information carried in a synchronization header field of the target code block to information corresponding to the code block of the ordered set type includes modifying, by the receiving device, the information carried in the synchronization header field of the target code block from 01 to 10.

In addition, the inter-packet gap may also be referred to as an inter-frame gap, and refers to a transmission time interval between two Ethernet data packets.

Each data packet includes a plurality of code blocks, a first code block of a data packet may be an S code block, and a last code block of a data packet may be a T code block.

Optionally, before the determining, by the receiving device, a target code block from the code block stream, the method further includes determining, by the receiving device, a termination location of the inter-packet gap based on a code block of a start type in the code block stream, and determining, by the receiving device, a start location of the inter-packet gap based on a code block of the termination type in the code block stream.

Specifically, any inter-packet gap #1 may be located between two data packets (which is denoted as a data packet #1 and a data packet #2). Assuming that the data packet #1 is located before the data packet #2 in a transmission sequence, a start location of the inter-packet gap #1 may be determined by a termination location of the data packet #1, to be specific, the start location of the inter-packet gap #1 may be determined by using a T code block in the data packet #1. In other words, when a device in the Ethernet receives the T code block in the data packet #1, it may be considered that the inter-packet gap #1 starts. In addition, a termination location of the data packet #2 may be determined by a start location of the data packet #2, to be specific, the start location of the inter-packet gap #1 may be determined by using the T code block in the data packet #1. In other words, when the device in the Ethernet receives an S code block in the data packet #2, it may be considered that the inter-packet gap #1 terminates.

For example, when the target code block includes the code block of the data type (the first target code block), each T code block in an Ethernet signal represents termination of a packet, and therefore, a start location of an inter-frame gap may be determined based on a location of the T code block.

In this case, optionally, the determining, by the receiving device, a target code block from the Ethernet signal includes determining, by the receiving device as the target code block, a code block of the data type that is received within a period in which a value of first inter-packet gap indication information is a preset first value, where when the receiving device receives the code block of the start type, the first inter-packet gap indication information is set to a preset second value, and when the receiving device receives the code block of the termination type, the first inter-packet gap indication information is set to the first value.

Alternatively, optionally, the determining, by the receiving device, a target code block from the Ethernet signal includes determining, by the receiving device, a code block located after a T code block as the target code block (the first target code block).

Alternatively, optionally, the determining, by the receiving device, a target code block from the Ethernet signal includes determining, by the receiving device, a code block located before an S code block as the target code block (the first target code block).

For another example, when the target code block includes the code block of the termination type (the second target code block), some T code blocks in the Ethernet signal may be generated after O code blocks are controlled to be modified. In this case, a start location of an inter-frame gap may be determined based on a location of a first T code block after an S code block.

In this case, the determining, by the receiving device, a start location of the inter-packet gap based on a code block of the termination type in the code block stream includes determining, by the receiving device, the start location of the inter-packet gap based on a code block of a first termination type in the code block stream, where the code block of the first termination type is a first code block that is of the termination type and that is located after the code block of the start type in a transmission sequence.

Optionally, the determining, by the receiving device, a target code block from the Ethernet signal includes determining, by the receiving device as the target code block (the second target code block), a code block of the termination type that is received within a period in which a value of first inter-packet gap indication information is a preset first value, where when the receiving device receives the code block of the start type, the first inter-packet gap indication information is set to a preset second value, and when the receiving device receives the code block of the termination type within a period in which the value of first inter-packet gap indication information is the second value, the first inter-packet gap indication information is set to the first value.

According to a second aspect, a method for receiving a code block stream is provided, including determining, by a sending device, a code block stream in a first rate mode based on a code block stream of a plurality of code blocks that is in a second rate mode, where a code block of an ordered set type in the code block stream in the second rate mode is modified to a code block of a data type, and/or a code block of an ordered set type in the code block stream in the second rate mode is modified to a code block of a termination type, and sending, by the sending device, the code block stream in the first rate mode to a transport network.

Because the code block of the ordered set type is transmitted in an inter-packet gap, the sending device may modify the code block of the ordered set type to the code block of the data type or the code block of the termination type that can be recognized by the transport network. In this way, a receiving device can determine that the code block of the data type or the code block of the termination type that is located in the inter-packet gap is modified based on the code block of the ordered set type, and may further modify the code block of the data type or the code block of the termination type that is located in the inter-packet gap back to the code block of the ordered set type. This can not only ensure that the code block of the ordered set type can be transmitted by using the transport network, but also ensure that the receiving device reliably recognizes the code block of the ordered set type, thereby improving communication accuracy.

In this application, the code block stream in the first rate mode may be a code block stream (or a bit code block stream or a bit stream) that is processed (for example, encoded or decoded) at a PCS and that is in an Ethernet signal (for example, a high-speed Ethernet signal) transmitted in the transport network (for example, a FlexE network).

In addition, the code block stream in the second rate mode may be a code block stream (or a bit code block stream or a bit stream) that is processed at the PCS and that is in an Ethernet signal (for example, a medium-low-speed Ethernet signal) transmitted before a client device and a transport device (for example, an ingress device or an egress device of the transport network).

In addition, the code block stream that is in the first rate mode and that is sent by the sending device may be generated after the sending device performs processing such as transcoding on the code block stream in the second rate mode.

The receiving device may be an egress device for the code block stream in the first rate mode (or an Ethernet signal including the code block stream in the first rate mode) in the transport network. To be specific, the Ethernet signal flows from the transport network to a destination network (including a destination client device of the Ethernet signal) of the Ethernet signal by using the egress device.

The sending device may be an ingress device for the code block stream in the first rate mode (or the Ethernet signal including the code block stream in the first rate mode) in the transport network. To be specific, the Ethernet signal flows from a source network (including a source client device of the Ethernet signal) of the Ethernet signal to the transport network by using the ingress device.

In this application, a rate corresponding to the second rate mode is less than or equal to a rate corresponding to the first rate mode.

"A rate corresponding to the second rate mode is less than or equal to a rate corresponding to the first rate mode" may be understood as a case in which a signal that is in the second rate mode and that is used as a signal in a high-speed mode may be obtained by aggregation of one or more signals that are in a low-speed mode and that include a signal in the first rate mode.

Alternatively, "a rate corresponding to the second rate mode is less than or equal to a rate corresponding to the first rate mode" may be understood as a case in which a quantity of slots that can be included by a signal in the second rate mode is greater than a quantity of slots that can be included in a signal in the first rate mode.

As an example instead of a limitation, the first rate mode may include a 40G BASE-R mode, a 100G BASE-R mode, a 200G BASE-R mode, or a 400G BASE-R mode.

Alternatively, the transport network may include an Ethernet physical link in a 40G BASE-R mode, a 100G BASE-R mode, a 200G BASE-R mode, or a 400G BASE-R mode, or the transport network may support an Ethernet physical interface mode with a rate of 40 Gbps, 100 Gbps, 200 Gbps, or 400 Gbps.

Alternatively, a transport device in the transport network forwards an Ethernet signal based on a 40G BASE-R mode, a 100G BASE-R mode, a 200G BASE-R mode, or a 400G BASE-R mode.

A transmission quantity of the code block stream (or an Ethernet signal including the code block stream in the first rate mode) in the first rate mode may be 40 Gbps, 100 Gbps, 200 Gbps, or 400 Gbps.

Alternatively, the Ethernet signal including the code block stream in the first rate mode may be an Ethernet signal in the 40G BASE-R mode, an Ethernet signal in the 100G BASE-R mode, an Ethernet signal in the 200G BASE-R mode, or an Ethernet signal in the 400G BASE-R mode.

As an example instead of a limitation, the second rate mode may include a 5G BASE-R mode, a 10G BASE-R mode, or a 25G BASE-R mode.

Alternatively, a link between the client device and the ingress device or the egress device of the transport network may include an Ethernet physical link in a 5G BASE-R mode, a 10G BASE-R mode, or a 25G BASE-R mode, or the client device may support an Ethernet physical interface mode with a rate of 5 Gbps, 10 Gbps, or 25 Gbps.

Alternatively, an Ethernet signal is forwarded between the client device and the ingress device or the egress device of the transport network based on the 5G BASE-R mode, the 10G BASE-R mode, or the 25G BASE-R mode.

A transmission quantity of the code block stream (or an Ethernet signal including the code block stream in the second rate mode) in the second rate mode may be 5 Gbps, 10 Gbps, or 25 Gbps.

Alternatively, the Ethernet signal including the code block stream in the second rate mode may be a signal in the 5G BASE-R mode, a signal in the 10G BASE-R mode, or a signal in the 25G BASE-R mode.

Optionally, the code block in the code block stream may be a 64b/66b code block, or may be a code block of any M bits/N bits, where M is less than or equal to N.

The code block of the ordered set type may also be referred to as an O code block.

For example, the O code block may include a code block in which information carried in a code block type field is 0x2d.

For another example, the O code block may include a code block in which information carried in a code block type field is 0x55.

A bit carried in a synchronization header field of the O code block is 10.

Optionally, information carried in a code block type field of the code block of the ordered set type is modified to code block type information corresponding to the termination type.

For example, the T code block may include a code block in which information carried in a code block type field is at least one of the following information:

0x87, 0x99, 0xAA, 0xB4, 0xCC, 0xD2, 0xE1, and 0xFF.

To be specific, the method includes modifying, by the sending device, the information carried in the code block type field of the code block of the ordered set type from 0x2d or 0x55 to one of 0x87, 0x99, 0xAA, 0xB4, 0xCC, 0xD2, 0xE1, and 0xFF.

Optionally, the determining, by a sending device, a code block stream in a first rate mode based on a code block stream of a plurality of code blocks that is in a second rate mode includes modifying, by the sending device based on a mapping relationship, information carried in a code block type field of a code block of a first ordered set type to information corresponding to a first termination type, where the mapping relationship is used to indicate a one-to-one mapping relationship between at least two termination types and at least two ordered set types, the first ordered set type corresponds to the first termination type, and the first ordered set type is any one of the at least two ordered set types.

For example, the O code block in which the information carried in the code block type field is 0x2d may correspond to a T code block in which information carried in a code block type field is 0xE1.

For another example, the O code block in which the information carried in the code block type field is 0x55 may correspond to a T code block in which information carried in a code block type field is 0xFF.

In addition, a bit carried in a synchronization header field of the T code block is 10.

Optionally, information carried in a synchronization header field of the code block of the ordered set type is modified to synchronization header information corresponding to the data type.

To be specific, the method includes modifying, by the receiving device, the information carried in the synchronization header field of the code block of the ordered set type to the synchronization header information corresponding to the data type.

The code block of the data type may also be referred to as a D code block.

A bit carried in a synchronization header field of the D code block is 01.

To be specific, in this case, the modifying, by the receiving device, the information carried in the synchronization header field of the code block of the ordered set type to the synchronization header information corresponding to the data type includes modifying, by the receiving device, the information carried in the synchronization header field of the code block of the ordered set type from 10 to 01.

In addition, the inter-packet gap may also be referred to as an inter-frame gap, and refers to a transmission time interval between two Ethernet data packets.

Each data packet includes a plurality of code blocks, a first code block of a data packet may be an S code block, and a last code block of a data packet may be a T code block.

According to a third aspect, a communications apparatus is provided, including units configured to perform various steps of the method in the first aspect or the second aspect and various implementations of the first aspect or the second aspect.

In a design, the communications apparatus is a communications chip, and the communications chip may include an input circuit or an interface that is configured to send information or data, and an output circuit or an interface that is configured to receive information or data.

In another design, the communications apparatus is a communications device (for example, an ingress device or an egress device), and the communications chip may include a transmitter configured to send information or data, and a receiver configured to receive information or data.

According to a fourth aspect, a communications device is provided, including a transceiver, a processor, and a memory. The processor is configured to control the transceiver to send and receive a signal, the memory is configured to store a computer program, and the processor is configured to invoke the computer program from the memory and run the computer program, so that the communications device performs the method in any one of the first aspect or the possible implementations of the first aspect.

Optionally, there are one or more processors, and there are one or more memories.

Optionally, the memory may be integrated with the processor, or the memory and the processor are separately disposed.

As an example instead of a limitation, the communications device may include an encoding device.

According to a fifth aspect, a communications device is provided, including a transceiver, a processor, and a memory. The processor is configured to control the transceiver to send and receive a signal, the memory is configured to store a computer program, and the processor is configured to invoke the computer program from the memory and run the computer program, so that the communications device performs the method in any one of the second aspect or the possible implementations of the second aspect.

Optionally, there are one or more processors, and there are one or more memories.

Optionally, the memory may be integrated with the processor, or the memory and the processor are separately disposed.

As an example instead of a limitation, the communications device may include a decoding device.

According to a sixth aspect, a processor is provided, including an input circuit, an output circuit, and a processing circuit. The processing circuit is configured to receive a signal by using the input circuit, and transmit a signal by using the output circuit, so that the processor performs the method in any one of the first aspect and the second aspect and the possible implementations of the first aspect and the second aspect.

In a specific implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by a device that may be but is not limited to a receiver, a signal output by the output circuit may be output to a device that may be but is not limited to a transmitter, and transmitted by the transmitter, the input circuit and the output circuit may be a same circuit, and the circuit is separately used as the input circuit and the output circuit at different moments. Specific implementations of the processor and various circuits are not limited in this embodiment of this application.

According to a seventh aspect, a processing apparatus is provided, including a memory and a processor. The processor is configured to read an instruction stored in the memory, receive a signal by using a receiver, and transmit a signal by using a transmitter, so as to perform the method in any one of the first aspect and the second aspect and the possible implementations of the first aspect and the second aspect.

Optionally, there are one or more processors, and there are one or more memories.

Optionally, the memory may be integrated with the processor, or the memory and the processor are separately disposed.

In specific implementation, the memory may be a non-transitory memory, for example, a read-only memory (ROM). The memory and the processor may be integrated onto a same chip, or may be separately disposed on different chips. A type of the memory and a manner of disposing the memory and the processor are not limited in this embodiment of the present disclosure.

According to an eighth aspect, a chip is provided, including a processor and a memory. The memory is configured to store a computer program, and the processor is configured to invoke the computer program from the memory and run the computer program. The computer program is used to implement the method in any one of the first aspect and the second aspect and the possible implementations of the first aspect and the second aspect.

According to a ninth aspect, a computer program product is provided. The computer program product includes a computer program (also referred to as code or an instruction), and when the computer program is run, a computer is enabled to perform the method in any one of the first aspect and the second aspect and the possible implementations of the first aspect and the second aspect.

According to a tenth aspect, a computer-readable medium is provided. The computer-readable medium stores a computer program (also referred to as code or an instruction), and when the computer program is run on a computer, the computer is enabled to perform the method in any one of the first aspect and the second aspect and the possible implementations of the first aspect and the second aspect.

According to the solutions in this application, because the code block of the ordered set type is transmitted in the inter-packet gap, the sending device may modify the code block of the ordered set type to the code block of the data type or the code block of the termination type that can be recognized by the transport network. In this way, the receiving device can determine that the code block of the data type or the code block of the termination type that is located in the inter-packet gap is modified based on the code block of the ordered set type, and may further modify the code block of the data type or the code block of the termination type that is located in the inter-packet gap back to the code block of the ordered set type. This can not only ensure that the code block of the ordered set type can be transmitted by using the transport network, but also ensure that the receiving device reliably recognizes the code block of the ordered set type, thereby improving communication accuracy.

BRIEF DESCRIPTION OF DRAWINGS

FIG. 3 is a schematic diagram of an example of a coding format used by a medium-low-speed Ethernet interface.

FIG. 5 is a schematic diagram of an example of a coding format used by a high-speed Ethernet interface.

DESCRIPTION OF EMBODIMENTS

The following describes technical solutions of this application with reference to the accompanying drawings.

Figure 1:
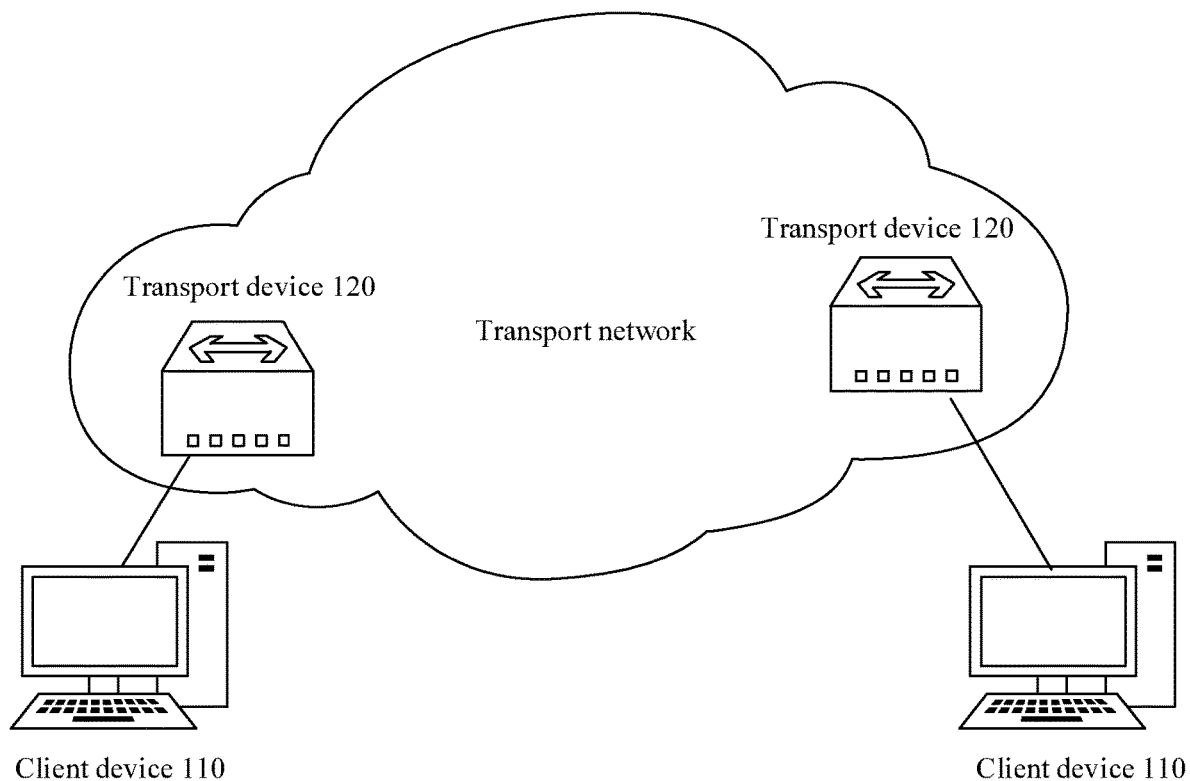
FIG. 1 is a schematic diagram of an example of a communications system according to this application.

FIG. 1 is a schematic diagram of an example of an Ethernet system 100 according to this application.

In this embodiment of this application, the communications system includes at least three client devices. For example, as shown in FIG. 1, the communications system may include a plurality of client devices 110.

In addition, in this embodiment of this application, the plurality of client devices 110 may communicate with each other by using a transport network (which may also be referred to as a forwarding network).

As an example instead of a limitation, in this embodiment of this application, the transport network may be, for example, an optical communications network.

In this embodiment of this application, the transport network may include a plurality of transport devices 120.

In this application, each client device 110 may be communicatively connected to one or more transport devices 120.

Figure 2:
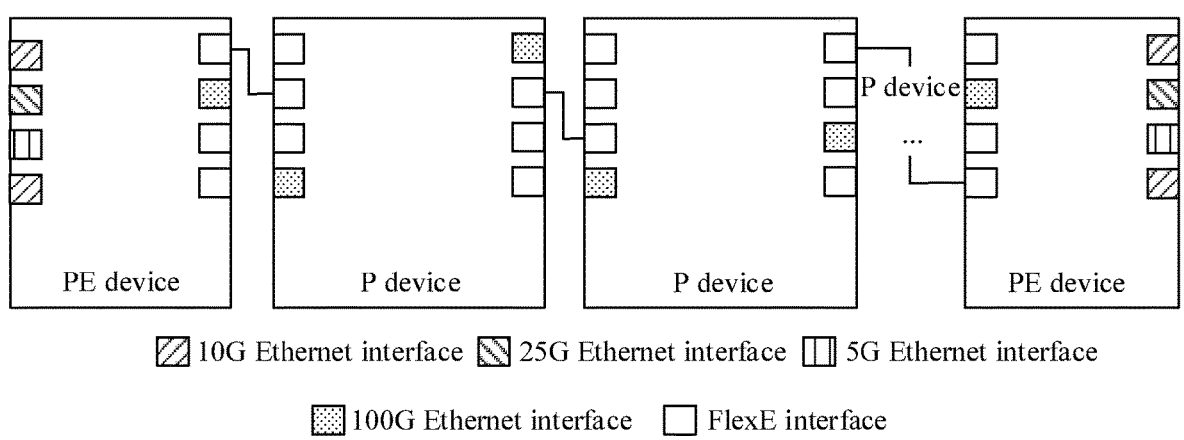
FIG. 2 is a schematic diagram of an example of a transport network according to this application.

FIG. 2 is a schematic diagram of an example of a structure of a transport network.

As shown in FIG. 2, the transport network may include a network edge (or a provider edge (PE)) device and a network (or a provider (P)) device.

The P device has a network side interface (or a network to network interface (NNI)). The NNI interface is configured to transmit data that complied with a communications protocol of the transport network. The NNI interface may include a common Ethernet interface (for example, a 100G BASE-R mode interface), or the NNI interface may include a FlexE interface.

In addition to the NNI, the PE device is further disposed with a user side interface (or a user network interface (UNI)). The UNI interface is used for data transmission between the PE device and a client device.

For an Ethernet signal, a PE device connected to a source client device of the Ethernet signal may be referred to as an ingress device (or an ingress transport device) for the Ethernet signal, and a PE device connected to a destination client device of the Ethernet signal may be referred to as an egress device (or an egress transport device) for the Ethernet signal.

When the source client device sends a signal to the destination client device, the source client device may generate the signal and transmit the signal to a transport device that is communicatively connected to the source client device, so that the transport device may route (or forward) the signal to the target client device of the signal.

In addition, the ingress transport device for the source client device in the transport network may further process the signal (for example, forwarding processing or encapsulation processing) to convert the signal into a signal that can be transmitted in the transport network, and transmit the signal to another transport device (for example, the egress transport device for the target client device) that is configured to transmit a signal to the destination receiving device in the transport network.

In addition, a transport device may further receive, from another transport device or client device, a signal that needs to be sent to a client device that is communicatively connected to the transport device, may process the signal (for example, transcoding processing or decapsulation processing) to convert the signal into a signal that can be recognized by the client device, and transmit a processed signal to the client device, so that the client device can parse the received signal to obtain data carried in the signal.

In addition, in this embodiment of this application, a signal transmitted between any two client devices may be processed and forwarded by using one transport device, or may be processed and forwarded by using a plurality of transport devices. This is not specifically limited in this application.

It should be understood that a quantity of client devices and a quantity of transport devices shown in FIG. 1 are merely examples for description. This is not specifically limited in this application.

In this embodiment of this application, the client device may be, for example, a client device such as a personal computer, and the client device can perform communication by using a medium such as an Ethernet or an optical fiber.

In this embodiment of this application, the client device may alternatively be a network device. The network device may be a server that provides various services for user equipment, for example, a software-defined networking (SDN) server, a world wide web (web) server, a File Transfer Protocol (FTP) server, a key enterprise application server and another key task server (for example, a server that provides a firewall service), or a service processing unit (SPU) in the communications (communication technology, CT) field.

In this embodiment of this application, the transport device may be a device such as a gateway device, a switch, or a router.

In this embodiment of this application, the client device may be a transmit end of a signal, or may be a receive end of a signal.

A transmit end client device may generate, according to Ethernet protocol specifications, a client Ethernet signal that can be recognized by a receive end Ethernet device. In addition, the transmit end client device may send the client Ethernet signal to an ingress transport device that is communicatively connected to the transmit end client device in the transport network.

The ingress transport device may encapsulate, according to Ethernet protocol specifications, the client Ethernet signal into a forwarding Ethernet signal that can be recognized by a transport device in the transport network.

The transport network routes the forwarding Ethernet signal to an egress transport device that is communicatively connected to a receive end client device.

The egress transport device may decapsulate the forwarding Ethernet signal, to restore the client Ethernet signal and send the client Ethernet signal to the client device.

The following describes the client Ethernet signal with reference to FIG. 3.

The client Ethernet signal may be a medium-low-speed Ethernet signal, or an interface mode of the client Ethernet signal may be a 5G BASE-R mode, a 10G BASE-R mode, or a 25G BASE-R mode.

In addition, the medium-low-speed Ethernet signal may be constituted by a 64b/66b code block of a medium-low-speed Ethernet.

The 64b/66b code block of the medium-low-speed Ethernet may include a 2b synchronization header field and an 8-byte (64b) code block payload(block payload).

In addition, the 64b/66b code block of the medium-low-speed Ethernet may include a data code block (data block) and a control code block (control block).

The control code block may also include a code block of an ordered set (ordered set, O) type, which is referred to as an O code block, a code block of a start (started) type, which is referred to as an S code block, and a code block of a termination (terminated) type, which is referred to as a T code block.

In this application, information (specifically, a 2b character) carried in a synchronization header field of the control code block may include 10.

In this application, a code block payload of the control code block may include a 1-byte code block type field (block type field).

To be specific, in this application, one code block may include a 2b synchronization header field, an 8b (1-byte) code block type field, and a 56b (7-byte) payload field.

FIG. 3 is a schematic diagram of an example of a coding format for the 64b/66b code block of the medium-low-speed Ethernet. As shown in FIG. 3, for example, information (specifically, a hexadecimal character) carried in a code block type field of the O code block may include but is not limited to 0x2d and 0x55.

Herein, "0x" may be used to indicate that a value following 0x is hexadecimal. Descriptions of the same or similar cases are omitted below.

Hereinafter, for ease of understanding and differentiation, a code block in which information carried in a code block type field is 0x2d is referred to as a 0x2d code block, and a code block in which information carried in a code block type field is 0x55 is referred to as a 0x55 code block.

It should be understood that the coding format for the 64b/66b code block of the medium-low-speed Ethernet shown in FIG. 3 is merely an example for description, and this application is not limited thereto. In other approaches, other coding formats, for code blocks, that can be used in the medium-low-speed Ethernet all fall within the protection scope of this application, for example, an error code block, an idle code block, and a low power idle (LPI) code block.

In addition, a coding process of the 64b/66b code block of the medium-low-speed Ethernet may be performed in a PCS entity of a transmit end client device.

The PCS is located between a reconciliation sublayer (RS) and a physical medium access sublayer (PMAS).

The PCS is used to map a well-defined Ethernet medium access control (MAC) function to existing coding and a function of a physical layer signal system. In addition, the PCS is used for line coding and cyclic redundancy check (CRC) check coding.

Correspondingly, a decoding process of the 64b/66b code block of the medium-low-speed Ethernet may be performed in a PCS entity of a receive end client device.

In this application, an Ethernet signal that is constituted by the 64b/66b code block of the medium-low-speed Ethernet may include a plurality of data packets.

Figure 4:
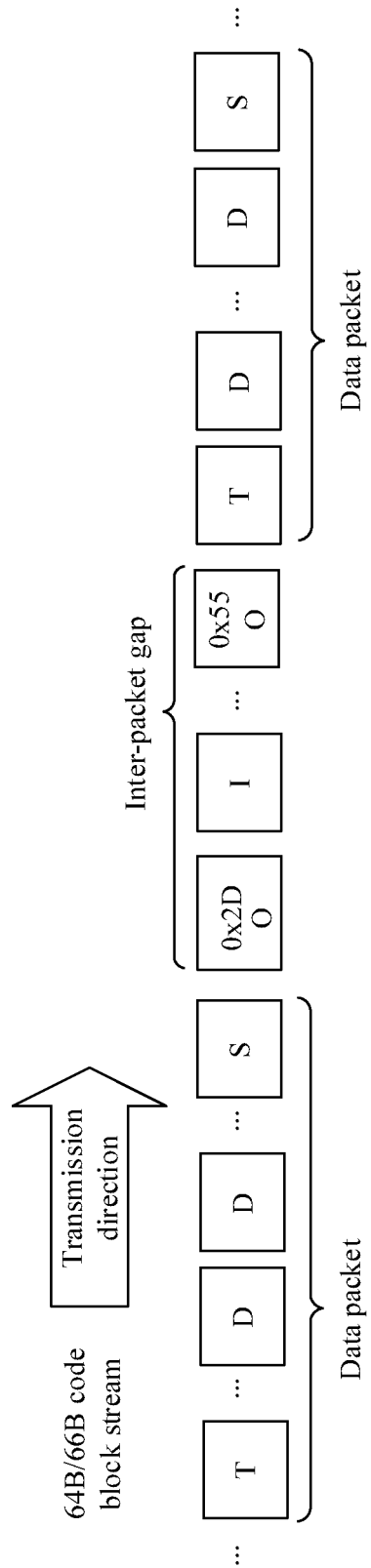
FIG. 4 is a schematic diagram of an example of a code stream of an Ethernet signal.

FIG. 4 shows an example of an Ethernet code stream with the foregoing structure. As shown in FIG. 4, each data packet may include one S code block, a plurality of D code blocks, and one T code block.

The S code block is used to indicate a start of the data packet, and the T code block is used to indicate a termination of the data packet.

In addition, in this application, there may be a time interval between two adjacent data packets, and the time interval may also be referred to as an inter-packet gap or an inter-frame gap.

As shown in FIG. 4, an O code block or the like may be transmitted in the inter-packet gap.

In addition, the coding process and the decoding process of the client Ethernet signal may be similar to those in other approaches. To avoid repetition, detailed descriptions are omitted herein.

The following describes the forwarding Ethernet signal with reference to FIG. 5.

A high-speed Ethernet signal transmitted in the transport network may also be referred to as a FlexE client.

The FlexE client is used to encapsulate user data and transmit the data in a data transmission manner defined for a FlexE interface. One FlexE client may carry a data stream of one user.

Specifically, in an Ethernet system, for example, slots may be divided in a time-division multiplexing (TDM) mode to implement hard isolation in transmission pipe bandwidth, and one service data stream may be allocated to one or more slots, thereby implementing matching of various rate services.

One FlexE group may include one or more bundled physical link interfaces with a same rate (for example, 100G BASE-R, 200G BASE-R, or 400G BASE-R), and each FlexE group carries one or more FlexE instances.

To be specific, in this application, the forwarding Ethernet signal may be a high-speed Ethernet signal, or an interface mode of the forwarding Ethernet signal may be a 100G BASE-R mode, a 200G BASE-R mode, or a 400G BASE-R mode.

A FlexE instance may be a unit that carries a FlexE client, and each FlexE instance may support, for example, a rate of 100 Gbps.

A slot allocation table corresponding to a FlexE group is referred to as a FlexE slot calendar, a slot mapping table corresponding to a single FlexE client is referred to as a sub-slot allocation table (sub-calendar), and a granularity of each slot is 5 G or 25 G. A calendar of one FlexE group is constituted by one or more sub-calendars, and each sub-calendar indicates how to allocate these slots to a corresponding FlexE client. The FlexE client represents a client data stream transmitted in a specified slot (one or more slots) in a FlexE instance specified on the FlexE Group, and one FlexE group may carry a plurality of FlexE clients.

One FlexE client may correspond to one to more user service data streams (MAC Client), and a FlexE shim may provide data adaptation and conversion from the FlexE client to a MAC client.

For example, in a FlexE group crossing four physical interfaces (for example, a 100G BASE-R physical interface), each physical interface may have twenty 5 G sub-slots. Therefore, the FlexE group has 20×4 sub-slots.

In addition, the high-speed Ethernet signal may be constituted by a 64b/66b code block of a high-speed Ethernet.

The 64b/66b code block of the high-speed Ethernet may include a 2b synchronization header field and an 8-byte code block payload.

In addition, the 64b/66b code block of the high-speed Ethernet may include a data code block and a control code block.

The control code block may also include an O code block, an S code block, and a T code block.

In this application, information (specifically, a 2b character) carried in a synchronization header field of the control code block may include 10.

In this application, a code block payload of the control code block may include a 1-byte code block type field.

FIG. 5 is a schematic diagram of an example of a coding format for the 64b/66b code block of the high-speed Ethernet. As shown in FIG. 5, for example, information (specifically, a hexadecimal character) carried in a code block type field of the O code block may include but is not limited to 0x4B.

It should be understood that the coding format for the 64b/66b code block of the high-speed Ethernet shown in FIG. 5 is merely an example for description, and this application is not limited thereto. In other approaches, other coding formats, for code blocks, that can be used in the medium-low-speed Ethernet all fall within the protection scope of this application, for example, an error code block, an idle code block, and a LPI code block.

In addition, a conversion (or encapsulation) process from the 64b/66b code block of the medium-low-speed Ethernet to the 64b/66b code block of the high-speed Ethernet or an encapsulation process from the medium-low-speed Ethernet signal to the high-speed Ethernet signal may be performed in a PCS entity of an ingress transport device.

Correspondingly, a conversion (or decapsulation) process from the 64b/66b code block of the high-speed Ethernet to the 64b/66b code block of the medium-low-speed Ethernet or an encapsulation process from the high-speed Ethernet signal to the medium-low-speed Ethernet signal may be performed in a PCS entity of an egress transport device.

Similar to the Ethernet signal that is constituted by the 64b/66b code block of the medium-low-speed Ethernet, in this application, an Ethernet signal that is constituted by the 64b/66b code block of the high-speed Ethernet may include a plurality of data packets.

As shown in FIG. 4, each data packet may include one S code block, a plurality of D code blocks, and one T code block.

The S code block is used to indicate a start of the data packet, and the T code block is used to indicate a termination of the data packet.

In addition, in this application, there may be a time interval between two adjacent data packets, and the time interval may also be referred to as an inter-packet gap or an inter-frame gap. As shown in FIG. 4, an O code block or the like may be transmitted in the inter-packet gap.

As shown in FIG. 3 and FIG. 5, some 0 code blocks, such as a 0x2d code block or a 0x55 code block, in the coding format for the medium-low-speed Ethernet signal (or the client Ethernet signal) do not exist in the coding format for the high-speed Ethernet signal (or the forwarding Ethernet signal).

If the 0x2d code block or the 0x55 code block enters the transport network, a transmission error is caused because a transport device cannot recognize the 0x2d code block or 0x55 code block.

In view of this, the following processing process may be used in this application to avoid a transmission error.

Figure 6:
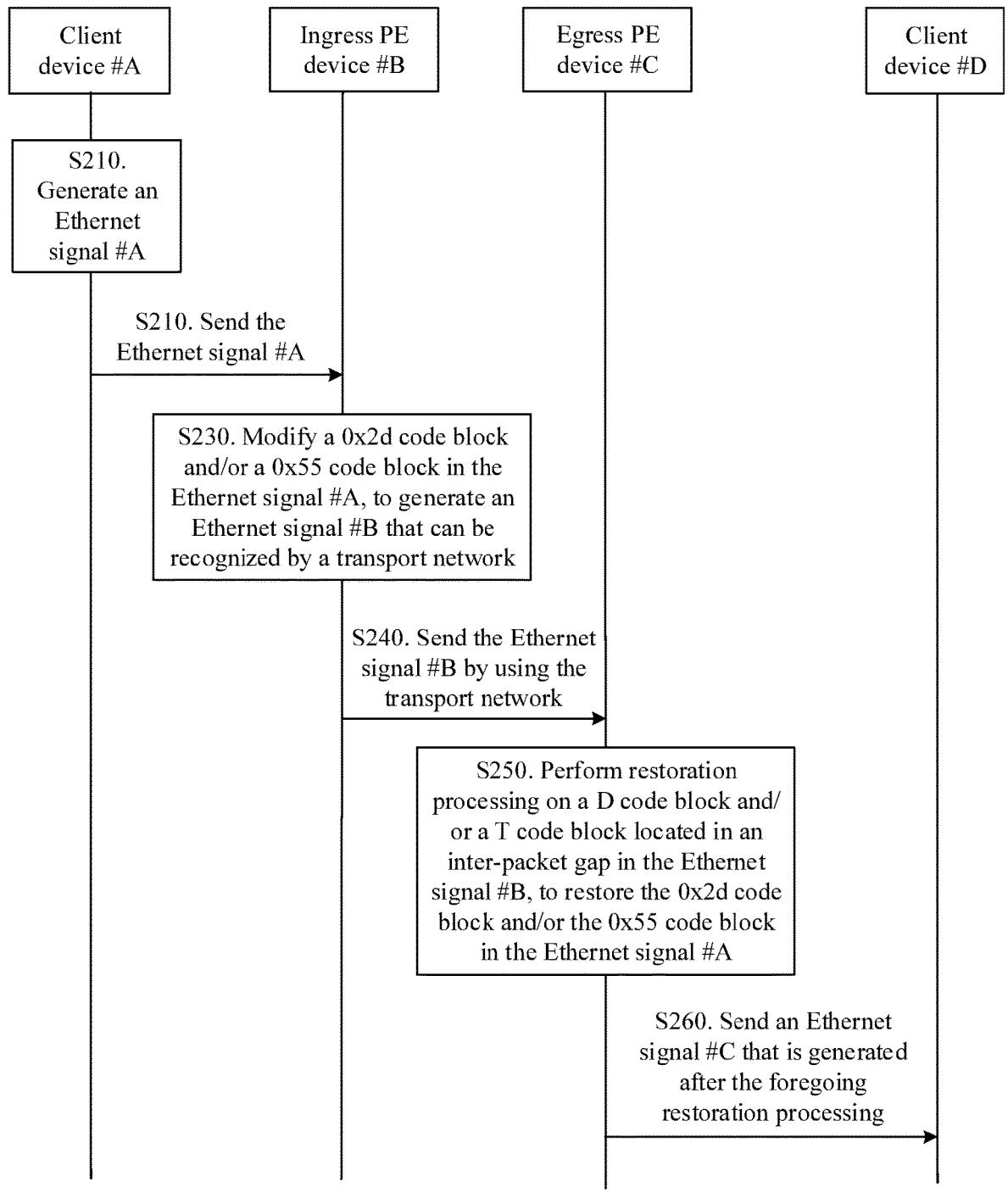
FIG. 6 is a schematic interaction diagram of an example of an Ethernet signal transmission process according to this application.

FIG. 6 is a schematic interaction diagram of an example of an Ethernet signal transmission process 200 according to this application.

As shown in FIG. 6, in S210, a client device #A may generate an Ethernet signal #A. The Ethernet signal #A may be a medium-low-speed Ethernet signal, to be specific, an interface mode of the Ethernet signal #A may be a 5G BASE-R mode, a 10G BASE-R mode, or a 25G BASE-R mode.

Figure 7:
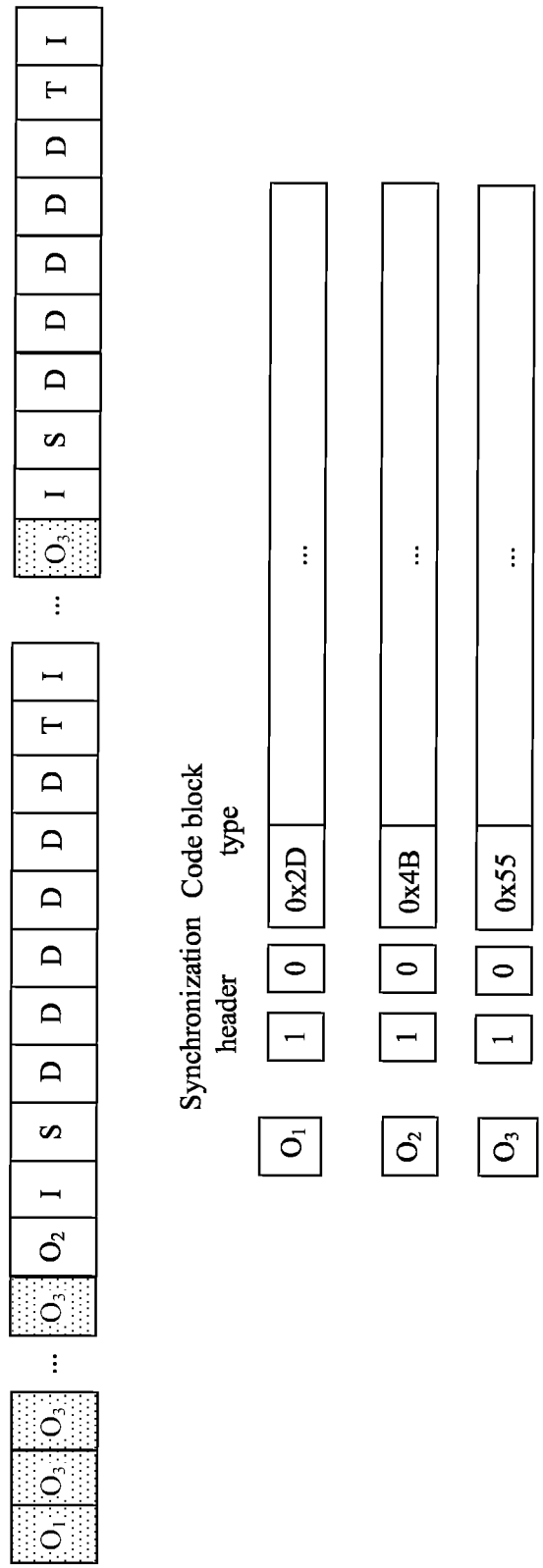
FIG. 7 is a schematic diagram of an example of a structure of a code block stream of a medium-low-speed Ethernet signal according to this application.

FIG. 7 shows an example of a structure of a PCS layer code block stream of the Ethernet signal #A. As shown in FIG. 7, the PCS layer code block stream of the Ethernet signal #A may include a plurality of data packets, there is an inter-packet gap between two data packets that are adjacent to each other in a sending sequence, and there may be an O code block, such as a 0x2d code block (as shown by "O$_1$" in FIG. 7), a 0x4B code block (as shown by "02" in FIG. 7), and a 0x55 code block (as shown by "O$_3$" in FIG. 7), and an idle code block (as shown by "I" in FIG. 7) in the inter-packet gap.

It should be noted that the structure of the code block stream shown in FIG. 7 is merely an example for description, and this application is not limited thereto. For example, only one of the 0x2d code block and the 0x55 code block may exist in the inter-packet gap.

In addition, because the 0x4B code block exists in both the medium-low-speed Ethernet signal and a high-speed Ethernet signal, code blocks that need to be modified in this application do not include the 0x4B code block.

In addition, a process of generating the Ethernet signal #A may be similar to that in other approaches. To avoid repetition, detailed descriptions are omitted herein.

In S220, the client device #A may send the Ethernet signal #A to a PE device that is communicatively connected to the client device #A. In the following, for ease of understanding and differentiation, the PE device is denoted as an ingress PE device #B.

In S230, the ingress PE device #B may modify the Ethernet signal #A to convert a code block (to be specific, the 0x2d code block and/or the 0x55 code block) that is in the Ethernet signal #A and that cannot be recognized by a transport network (specifically, each transport device) into a code block that can be recognized by the transport network.

As an example instead of a limitation, the following modification manners may be listed in this application.

Manner 1

When the PCS layer code block stream of the Ethernet signal #A includes the 0x2d code block, the ingress PE device #B may modify the 0x2d code block to a D code block.

Figure 8:
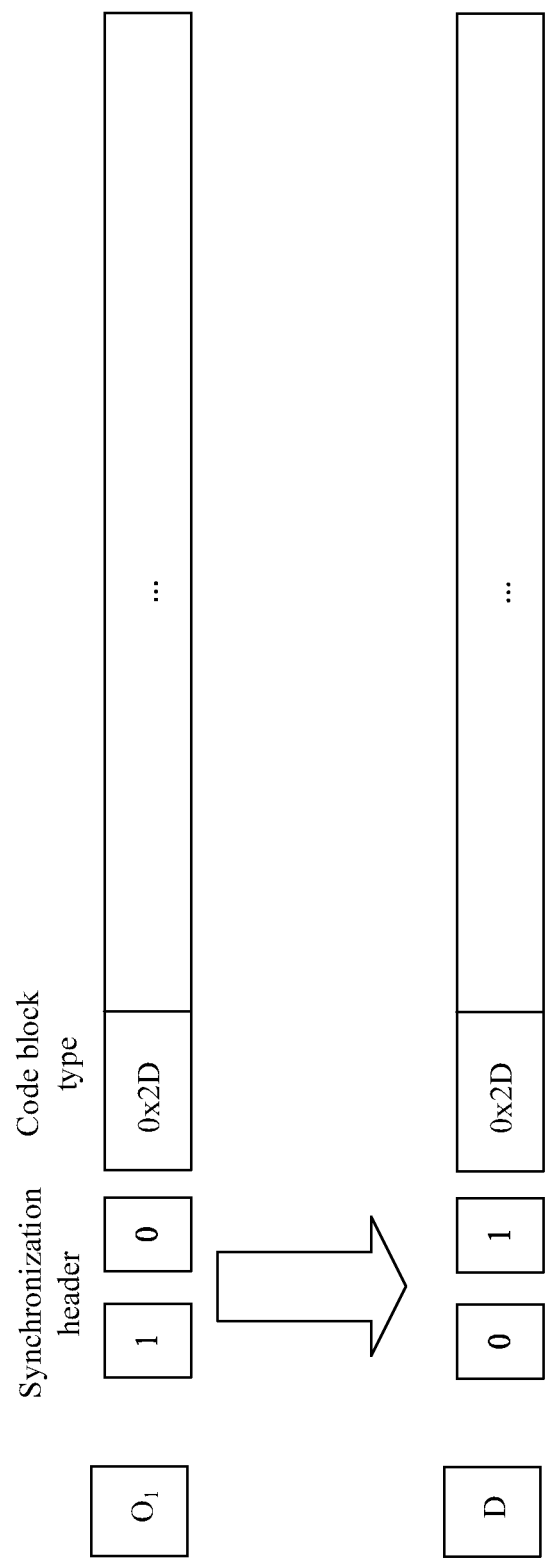
FIG. 8 is a schematic diagram of an example of a change of a 0x2d code block in a modification process according to this application.

FIG. 8 is a schematic diagram of a change of the 0x2d code block in a modification process in Manner 1. As shown in FIG. 8, the ingress PE device #B may modify information carried in a synchronization header field of the 0x2d code block from information (for example, "10") corresponding to a control type code block to information (for example, "01") corresponding to a data type code block.

When the PCS layer code block stream of the Ethernet signal #A includes the 0x55 code block, the ingress PE device #B may modify the 0x55 code block to a D code block.

Figure 9:
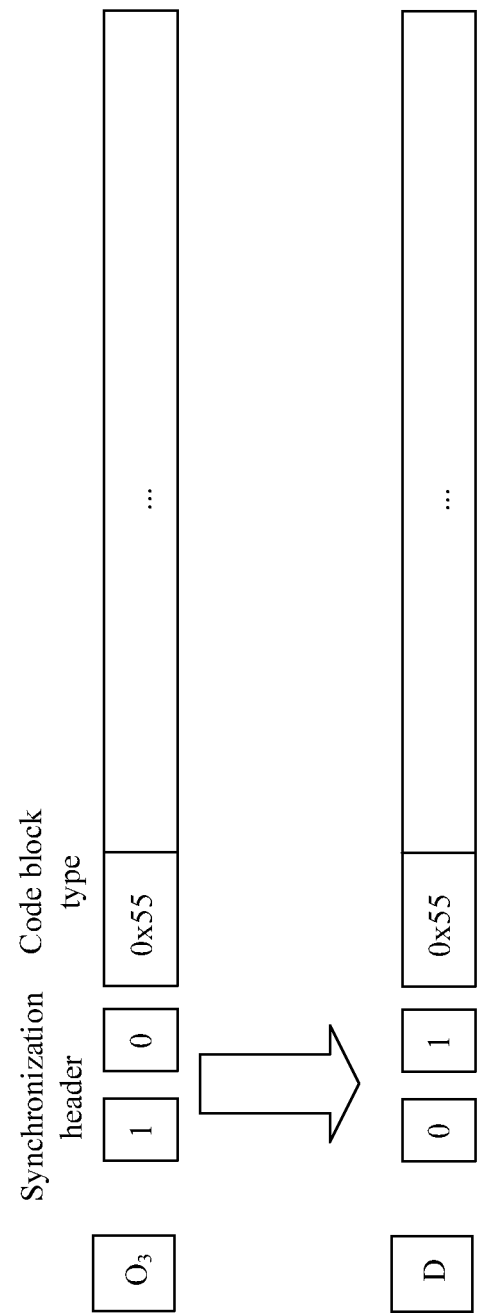
FIG. 9 is a schematic diagram of an example of a change of a 0x55 code block in a modification process according to this application.

FIG. 9 is a schematic diagram of a change of the 0x55 code block in a modification process in Manner 1. As shown in FIG. 9, the ingress PE device #B may modify information carried in a synchronization header field of the 0x55 code block from information (for example, "10") corresponding to a control type code block to information (for example, "01") corresponding to a data type code block.

Figure 10:
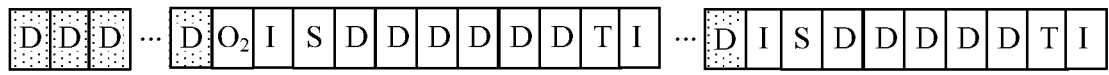
FIG. 10 is a schematic diagram of an example of a structure of a modified code block stream.

FIG. 10 shows a change of the PCS layer code block stream, of the Ethernet signal, that is shown in FIG. 7 and that is obtained after modification is performed based on Manner 1. As shown in FIG. 10, after the modification is performed based on Manner 1, the 0x2d code block and/or the 0x55 code block in the PCS layer code block stream of the low-speed Ethernet signal are converted into D code blocks.

Manner 2

When the PCS layer code block stream of the Ethernet signal #A includes the 0x2d code block, the ingress PE device #B may modify the 0x2d code block to a T code block.

Specifically, the ingress PE device #B may modify information carried in a code block type field of the 0x2d code block from information (for example, "0x2d") corresponding to the 0x2d code block to information (for example, any piece of information in "0x87", "0x99", "0xAA", "0xB4", "0xCC", "0xD2", "0xE1", and "0xFF") corresponding to the T code block.

When the PCS layer code block stream of the Ethernet signal #A includes the 0x55 code block, the ingress PE device #B may modify the 0x55 code block to a T code block.

Specifically, the ingress PE device #B may modify information carried in a code block type field of the 0x55 code block from information (for example, "0x55") corresponding to the 0x55 code block to information (for example, any piece of information in "0x87", "0x99", "0xAA", "0xB4", "0xCC", "0xD2", "0xE1", and "0xFF") corresponding to the T code block.

It should be noted that the 0x2d code block and the 0x55 code block may both exist in an Ethernet signal in actual transmission. Therefore, in this case, if the information carried in the code block type field of the 0x2d code block and the information carried in the code block type field of the 0x55 code block are modified to information corresponding to a same T code block (which is denoted as T code block #1), an egress PE device cannot determine whether the T code block #1 in the received Ethernet signal should be restored to the 0x2d code block or the 0x55 code block. The egress PE device may be a PE device that is communicatively connected to a destination client device of the Ethernet signal #A. In the following, for ease of understanding and differentiation, the PE device is denoted as an egress PE device #C.

In view of this, in this application, a mapping relationship #A may be stored on the egress PE device #C and the ingress PE device #B in advance.

The mapping relationship #A may be used to indicate a correspondence between the 0x2d code block and a T code block (which is denoted as a T code block #a), and the mapping relationship #A may be used to indicate a correspondence between the 0x55 code block and another T code block (which is denoted as a T code block #b).

To be specific, the ingress PE device #B may modify, based on an indication of the mapping relationship #A, the information carried in the code block type field of the 0x2d code block from the information (for example, "0x2d") corresponding to the 0x2d code block to information corresponding to a code block type field of the T code block #a.

As an example instead of a limitation, the T code block #a may be a T6 code block, to be specific, the T code block #a may be a code block in which information corresponding to a code block type field is "0xE1".

Because a quantity of bytes that can be used to carry data in the T6 code block is relatively large, modifying the 0x2d code block to the T6 code block can ensure that information in a modified code block is not lost, thereby further improving an effect of this application.

It should be understood that a specific example of the listed T code block #a is merely an example for description, and this application is not limited thereto. The T code block #a may be any one of T0 to T7 code blocks, provided that it is ensured that the T code block #a is different from the T code block #b.

Figure 11:
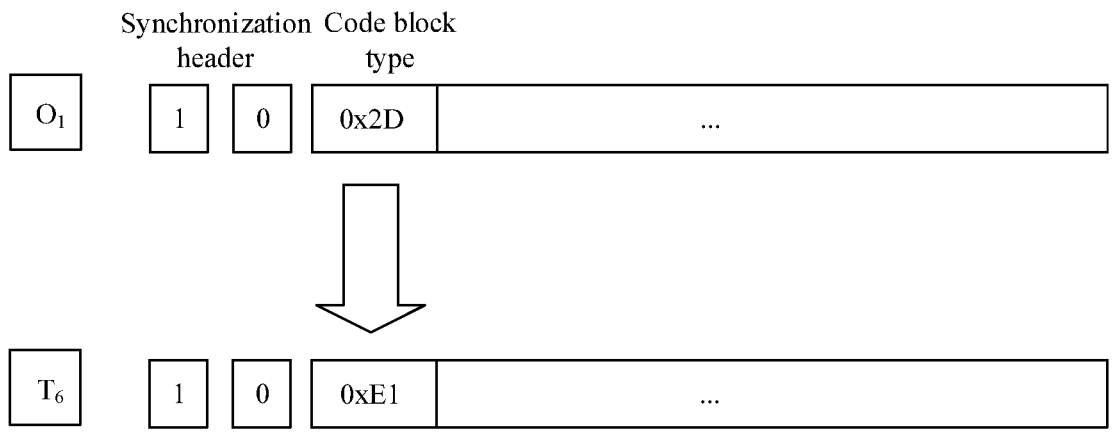
FIG. 11 is a schematic diagram of another example of a change of a 0x2d code block in a modification process according to this application.

FIG. 11 is a schematic diagram of a change of the 0x2d code block in a modification process in Manner 2. As shown in FIG. 11, the ingress PE device #B may modify the information carried in the code block type field of the 0x2d code block from "0x2d" to "0xE1".

Figure 12:
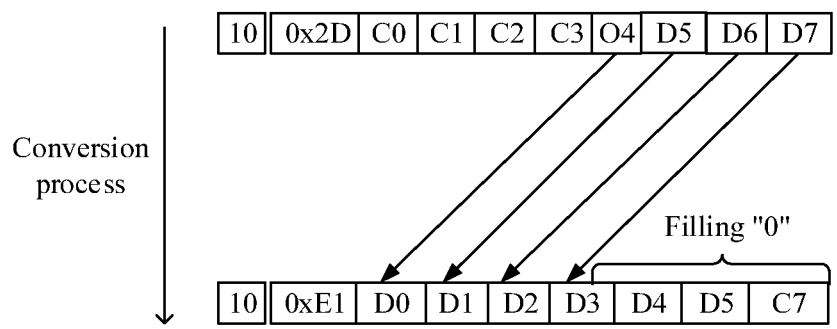
FIG. 12 is a schematic diagram of still another example of a change of a 0x2d code block in a modification process according to this application.

Optionally, as shown in FIG. 12, in this application, the ingress PE device #B may alternatively shift information carried in an "04" byte in the 0x2d code block to a "D0" byte in the T6 code block, may shift information carried in a "D5" byte in the 0x2d code block to a "D1" byte in the T6 code block, may shift information carried in a "D6" byte in the 0x2d code block to a "D2" byte in the T6 code block, and may shift information carried in a "D7" byte in the 0x2d code block to a "D3" byte in the T6 code block.

In addition, the ingress PE device #B may further fill a specified bit such as "0" in "D4", "D5", "D6", and "D7" bytes in the T6 code block that are generated based on the foregoing modification.

In addition, because a quantity of bits included in the information carried in the "04" byte in the 0x2d code block is less than one byte, the information carried in the "04" byte in the 0x2d code block occupies only some bits in the "D0" byte in the T6 code block, the information carried in the "D5" byte in the 0x2d code block occupies the other bits in the "D0" byte and some bits in the "D1" byte in the T6 code block, the information carried in the "D6" byte in the 0x2d code block occupies the other bits in the "D1" byte and some bits in the "D2" byte in the T6 code block, and the information carried in the "D7" byte in the 0x2d code block occupies the other bits in the "D2" byte and some bits in the "D3" byte in the T6 code block.

In addition, in this case, a specified bit such as "0" may be filled in the other bits in the "D3" byte in the T6 code block (to be specific, bits in which the information carried in the "D7" byte in the 0x2d code block are not filled).

In conclusion, as shown in FIG. 12, in this application, the ingress PE device #B may alternatively shift information carried in the "04" byte, the "D5" byte, the "D6" byte, and the "D7" byte in the 0x2d code block to the "D0" byte, the "D1" byte, the "D2" byte, and the "D3" byte in the T6 code block, and a location relationship between bits after the shift is the same as a location relationship between bits before the shift.

As an example instead of a limitation, the T code block #b may be a T7 code block, to be specific, the T code block #b may be a code block in which information corresponding to a code block type field is "0xFF".

Because a quantity of bytes that can be used to carry data in the T7 code block is relatively large, modifying the 0x55 code block to the T7 code block can ensure that information in a modified code block is not lost, thereby further improving an effect of this application.

It should be understood that a specific example of the listed T code block #b is merely an example for description, and this application is not limited thereto. The T code block #b may be any one of T0 to T7 code blocks, provided that it is ensured that the T code block #a is different from the T code block #b.

Figure 13:
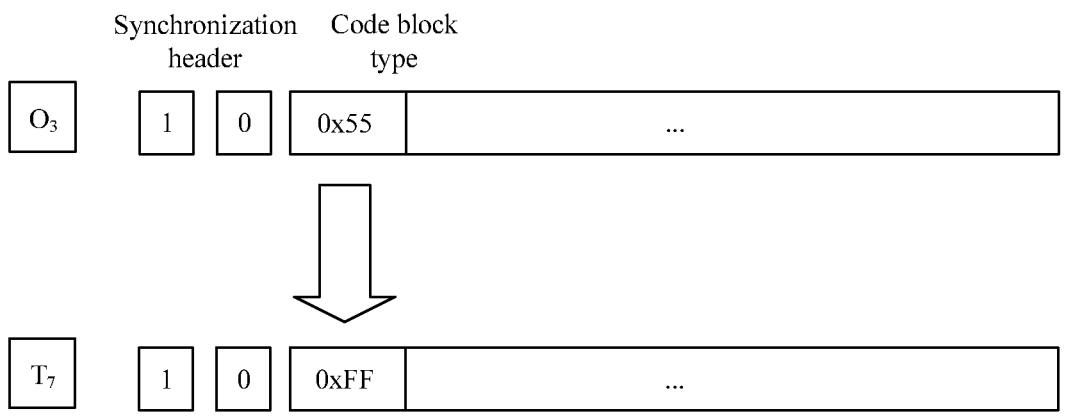
FIG. 13 is a schematic diagram of another example of a change of a 0x55 code block in a modification process according to this application.

FIG. 13 is a schematic diagram of a change of the 0x55 code block in a modification process in Manner 2. As shown in FIG. 13, the ingress PE device #B may modify the information carried in the code block type field of the 0x2d code block from "0x55" to "0xFF".

It should be noted that the mapping relationship #A may be determined by a management device in the transport network and delivered to each transport device, or the mapping relationship #A may be specified in a communications system or a communications protocol in advance, or the mapping relationship #A may be determined through negotiation between the ingress PE and the egress PE, or the mapping relationship #A may be entered by a user or an administrator to the ingress PE and the egress PE, or the mapping relationship #A may be configured on the ingress PE and the egress PE by a manufacturer or an operator. This is not specifically limited in this application.

Figure 14:
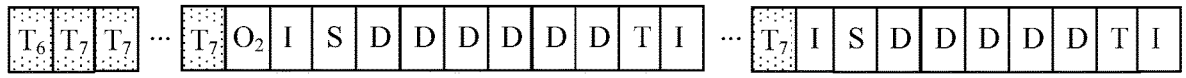
FIG. 14 is a schematic diagram of another example of a structure of a modified code block stream.

FIG. 14 shows a change of the PCS layer code block stream, of the Ethernet signal, that is shown in FIG. 7 and that is obtained after modification is performed based on Manner 2. As shown in FIG. 14, after the modification is performed based on Manner 2, the 0x2d code block and/or the 0x55 code block in the PCS layer code block stream of the low-speed Ethernet signal are converted into T code blocks.

Manner 3

When the PCS layer code block stream of the Ethernet signal #A includes the 0x2d code block, the ingress PE device #B may modify the 0x2d code block to a D code block.

When the PCS layer code block stream of the Ethernet signal #A includes the 0x55 code block, the ingress PE device #B may modify the 0x55 code block to a T code block.

Manner 4

When the PCS layer code block stream of the Ethernet signal #A includes the 0x2d code block, the ingress PE device #B may modify the 0x2d code block to a T code block.

When the PCS layer code block stream of the Ethernet signal #A includes the 0x55 code block, the ingress PE device #B may modify the 0x55 code block to a D code block.

In Manner 3 and Manner 4, a modification process for each code block may be similar to a process described in Manner 1 or Manner 2. To avoid repetition, detailed descriptions are omitted herein.

It should be noted that in this application, because the egress PE device #C needs to restore the modified code block described above, a restoration manner used by the egress PE device #C needs to correspond to a modification manner used by the ingress PE device #B (for example, the restoration manner and the modification manner are processing mutually reverse to each other), so as to ensure accuracy of the restoration.

As an example instead of a limitation, in this application, the modification manner used by the ingress device #A may be specified in a communications system or a communications protocol in advance, or the modification manner used by the ingress device #A may be determined through negotiation between the egress PE device #C and the ingress PE device #B, or the modification manner used by the ingress device #A may be determined by the management device of the transport network and delivered to the ingress PE device #B, and the management device may deliver the restoration manner corresponding to the modification manner to the egress PE device #C.

In addition, in S240, the ingress PE device #B may generate, based on a modified Ethernet signal #A, a high-speed Ethernet signal (for example, an Ethernet signal supported by the FlexE client) to be transmitted in the transport network. In the following, for ease of understanding and description, the high-speed Ethernet signal is referred to as an Ethernet signal #B. In addition, the ingress PE device #B may send the Ethernet signal #B to the egress PE device #C by using the transport network. A process may be similar to that in other approaches. To avoid repetition, detailed descriptions are omitted herein.

In S250, the egress PE device #C may determine, from a PCS layer code block stream of the received Ethernet signal #B, a code block modified by the ingress PE device #B. In the following, for ease of understanding and differentiation, the code block is denoted as a code block #A.

Because the code block #A is generated after the ingress PE device #B modifies an O code block (for example, the 0x2d code block or the 0x55 code block), and the O code block exists in an inter-packet gap. Therefore, the egress PE device #C may determine the code block #A based on an inter-frame gap of the PCS layer code block stream of the Ethernet signal #B.

The code block #A may include only a D code block (Case 1) or the code block #A may include a T code block (Case 2). In the foregoing different cases, a method for determining an inter-frame gap is different. The following separately describes in detail processes of determining an inter-frame gap by the egress PE device #C in the foregoing cases.

Case 1

The code block #A may include only a D code block. It may be understood that the ingress PE device #B modifies the 0x2d code block or the 0x55 code block to a D code block, or the ingress PE device #B does not modify the 0x2d code block or the 0x55 code block to a T code block.

In this case, T code blocks in the PCS layer code block stream of the Ethernet signal #B are all T code blocks in the PCS layer code block stream of the Ethernet signal #A. To be specific, each T code block in the PCS layer code block stream of the Ethernet signal #B may indicate a termination of a data packet to which the T code block belongs. Alternatively, each T code block in the PCS layer code block stream of the Ethernet signal #B may determine a start of an inter-packet gap located after the T code block.

For example, the egress PE device #C may determine an inter-packet gap in the PCS layer code block stream of the Ethernet signal #B based on a T code block and an S code block in the PCS layer code block stream of the Ethernet signal #B, to be specific, any inter-packet gap (for example, an inter-packet gap #1) meets the following condition.

The inter-packet gap #1 is located between a data packet #1 and a data packet #2 that are adjacent to each other in a transmission sequence, or the inter-packet gap #1 is located between a T code block of the data packet #1 and an S code block of the data packet #2.

Therefore, the egress PE device #C may determine, as the code block #A, a D code block received in the inter-packet gap.

For another example, after receiving a T code block, the egress PE device #C may determine, as the code block #A, a D code block received after the T code block until the S code block is received.

Figure 15:
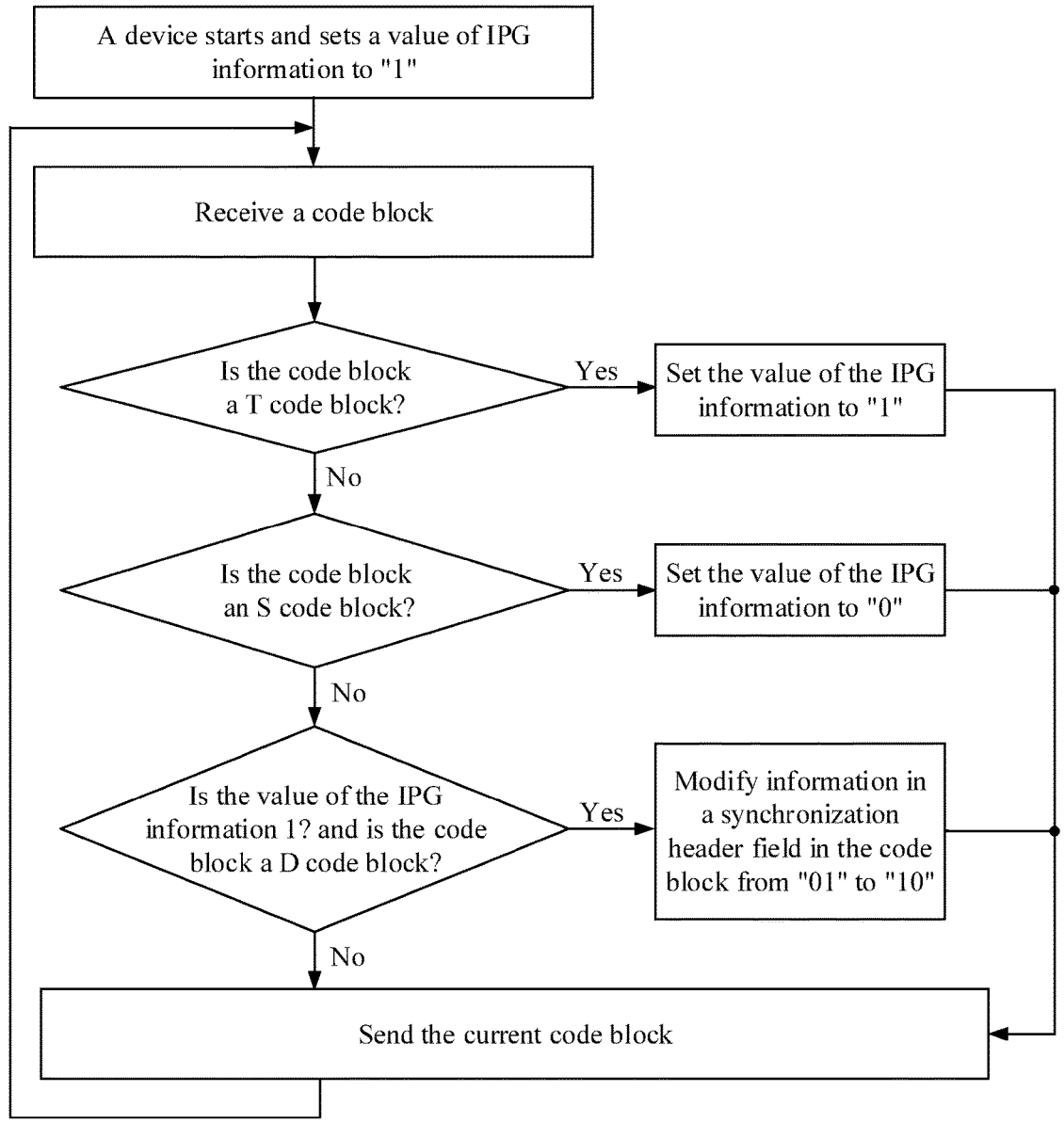
FIG. 15 is a schematic diagram of an example of a process in which an egress PE device determines an inter-frame gap.

For another example, FIG. 15 shows an example of a processing process of the egress PE device #C. As shown in FIG. 15, the egress PE device #C may store inter-packet gap information, and the inter-packet gap information may be used to determine an inter-packet gap.

To be specific, after receiving a T code block, the PE device #A may set a value of the inter-packet gap information to a value, for example, "1", indicating that a current time period is the inter-packet gap.

In addition, after receiving the T code block, the PE device #A may set the value of the inter-packet gap information to a value, for example, "0", indicating that the current time period is not the inter-packet gap.

In this case, the egress PE device #C may determine, as the code block #A, a D code block received in a period in which the value of the inter-packet gap information is "1".

Optionally, after the egress PE device #C is powered on (or started), the value of the inter-packet gap information may be set to "1". Therefore, when an inter-packet gap exists before a first data packet of the Ethernet signal #A and an O code block exists in the inter-packet gap, it can be ensured that the egress PE device #C identifies a D code block modified based on the O code block.

Case 2

The code block #A may include a T code block, and it may be understood that the code block #A may include only the T code block. To be specific, the ingress PE device #B modifies the 0x2d code block or the 0x55 code block to a T code block.

Alternatively, the code block #A may include a T code block, and it may be understood that the code block #A may include both the T code block and a D code block. To be specific, the ingress PE device #B modifies one of the 0x2d code block or the 0x55 code block to a T code block, and the ingress PE device #B modifies the other of the 0x2d code block or the 0x55 code block to a D code block.

In this case, T code blocks in the PCS layer code block stream of the Ethernet signal #B may include a T code block in the PCS layer code block stream of the Ethernet signal #A and a T code block generated based on the O code block. To be specific, some T code blocks in the PCS layer code block stream of the Ethernet signal #B each may indicate a termination of a data packet to which the T code block belongs, and the other T code blocks each cannot indicate a termination of a data packet. Alternatively, some T code blocks in the PCS layer code block stream of the Ethernet signal #B each may determine a start of an inter-packet gap located after the T code block, and the other T code blocks each cannot indicate a start of an inter-packet gap.

For example, the egress PE device #C may determine an inter-packet gap in the PCS layer code block stream of the Ethernet signal #B based on a T code block and an S code block in the PCS layer code block stream of the Ethernet signal #B, to be specific, any inter-packet gap (for example, an inter-packet gap #1) meets the following condition.

The inter-packet gap #1 is located between a data packet #1 and a data packet #2 that are adjacent to each other in a transmission sequence, or the inter-packet gap #1 is located between a T code block of the data packet #1 and an S code block of the data packet #2.

The T code block of the data packet #1 is a first T code block after the S code block of the data packet #2.

In this case, the egress PE device #C may determine, as the code block #A, a D code block or a T code block received in the inter-packet gap.

For another example, after receiving an S code block, the egress PE device #C may determine a first T code block after the S code block, and determine, as the code block #A, a D code block or a T code block received after the T code block, until the S code block is received.

Figure 16:
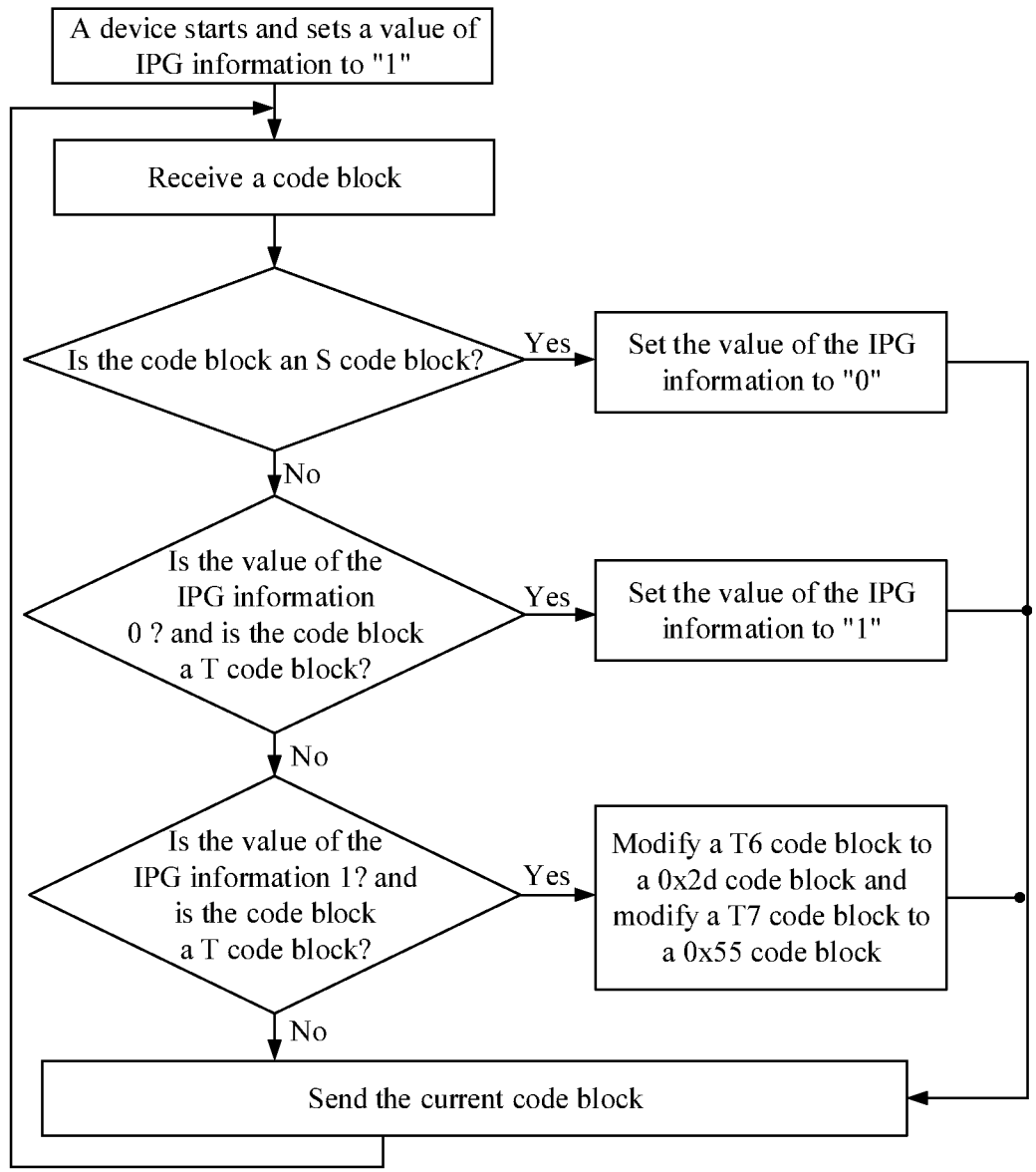
FIG. 16 is a schematic diagram of another example of a process in which an egress PE device determines an inter-frame gap.

For another example, FIG. 16 shows an example of a processing process of the egress PE device #C. As shown in FIG. 16, the egress PE device #C may store inter-packet gap information, and the inter-packet gap information may be used to determine an inter-packet gap.

To be specific, after receiving an S code block, the PE device #A may set a value of the inter-packet gap information to a value, for example, "0", indicating that a current time period is not the inter-packet gap.

In addition, after receiving a T code block, if the value of the inter-packet gap information is "0", the PE device #A may set the value of the inter-packet gap information to a value, for example, "1", indicating that the current time period is the inter-packet gap.

In addition, after receiving a T code block, if the value of the inter-packet gap information is "1", the PE device #A may set the value of the inter-packet gap information to a value, for example, "1", indicating that the current time period is the inter-packet gap.

In this case, the egress PE device #C may determine, as the code block #A, a D code block or a T code block received in a period in which the value of the inter-packet gap information is "1".

Optionally, after the egress PE device #C is powered on (or started), the value of the inter-packet gap information may be set to "1". Therefore, when an inter-packet gap exists before a first data packet of the Ethernet signal #A and an O code block exists in the inter-packet gap, it can be ensured that the egress PE device #C identifies a D code block modified based on the O code block.

In addition, the egress PE device #C performs restoration processing on the code block #A to restore the code block #A to a code block (to be specific, the 0x2d code block and/or the 0x55 code block) corresponding to the code block #A in the Ethernet signal #A.

As an example instead of a limitation, the following modification manners may be listed in this application.

Manner a

When the ingress PE device #B performs a modification in Manner 1, the egress PE device #C may modify the code block #A to the 0x2d code block or the 0x55 code block.

Figure 17:
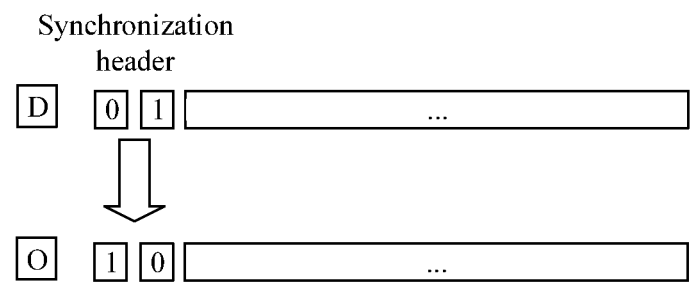
FIG. 17 is a schematic diagram of an example of a change of a D code block or a T code block located in an inter-frame gap in a restoration process according to this application.

FIG. 17 is a schematic diagram of a change of the code block #A in a modification process of Manner a. As shown in FIG. 17, the egress PE device #C may modify information carried in a synchronization header field of the code block #A from the information (for example, "01") corresponding to the data type code block to the information (for example, "10") corresponding to the control type code block.

It should be noted that in Manner a, the code block #A may be the 0x2d code block or the 0x55 code block. This is not specifically limited in this application.

Manner b

When the ingress PE device #B performs a modification in Manner 2, the egress PE device #C may modify the code block #A to the 0x2d code block or the 0x55 code block.

The egress PE device #C may modify information carried in a code block type field of the code block #A from the information (for example, any piece of information in "0x87", "0x99", "0xAA", "0xB4", "0xCC", "0xD2", "0xE1", and "0xFF") corresponding to the T code block to the information (for example, "0x2d") corresponding to the 0x2d code block or the information (for example, "0x55") corresponding to the 0x55 code block.

It should be noted that the 0x2d code block and the 0x55 code block may both exist in an Ethernet signal in actual transmission. Therefore, in this case, the egress PE device #C may not be able to determine whether the information corresponding to the T code block is modified to the information corresponding to the 0x2d code block or the information corresponding to the 0x55 code block.

In view of this, in this application, the mapping relationship #A may be stored on the egress PE device #C and the ingress PE device #B in advance.

The mapping relationship #A may be used to indicate a correspondence between the 0x2d code block and a T code block (which is denoted as a T code block #a), and the mapping relationship #A may be used to indicate a correspondence between the 0x55 code block and another T code block (which is denoted as a T code block #b).

As an example instead of a limitation, the T code block #a may be a T6 code block, to be specific, the T code block #a may be a code block in which information corresponding to a code block type field is "0xE1".

Because a quantity of bytes that can be used to carry data in the T6 code block is relatively large, modifying the 0x2d code block to the T6 code block can ensure that information in a modified code block is not lost, thereby further improving an effect of this application.

It should be understood that a specific example of the listed T code block #a is merely an example for description, and this application is not limited thereto. The T code block #a may be any one of T0 to T7 code blocks, provided that it is ensured that the T code block #a is different from the T code block #b.

In this case, the egress PE device #C may modify, based on an indication of the mapping relationship #A, information carried in a code block type field of the T code block #a to the information (for example, "0x2d") corresponding to the 0x2d code block.

Figure 18:
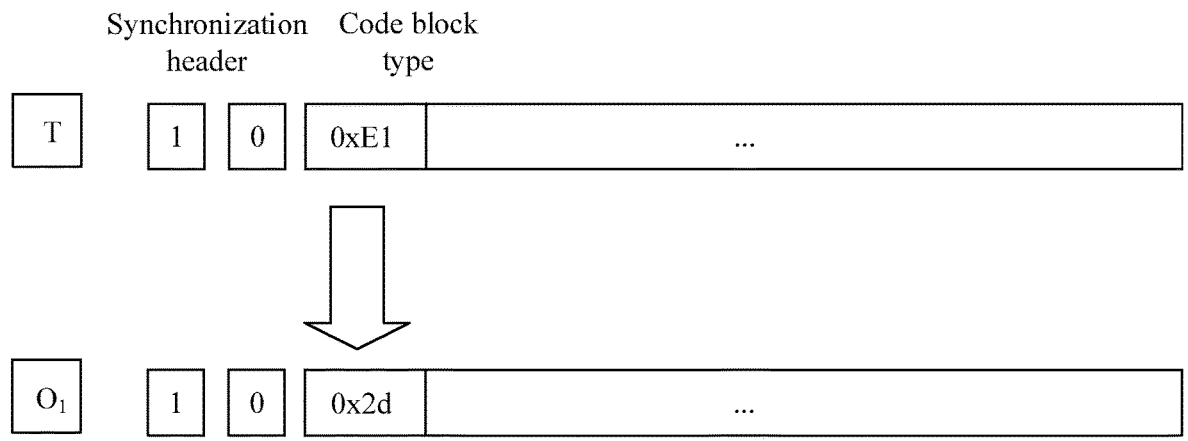
FIG. 18 is a schematic diagram of another example of a change of a T code block located in an inter-frame gap in a restoration process according to this application.

FIG. 18 is a schematic diagram of a change of the T code block #a in a modification process of Manner 2. As shown in FIG. 18, the egress PE device #C may modify the information carried in the code block type field of the T code block #a that is located in an inter-packet gap in the Ethernet signal #B from "0xE1" to "0x2d".

Figure 19:
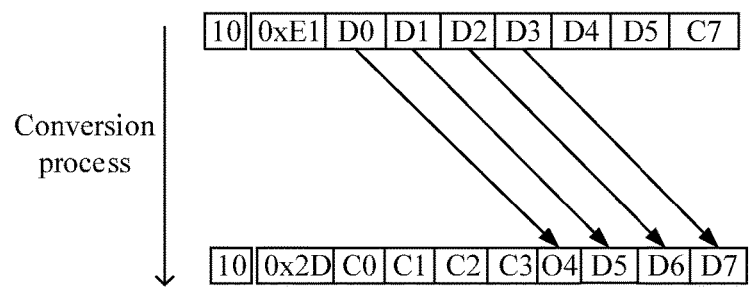
FIG. 19 is a schematic diagram of still another example of a change of a T code block located in an inter-frame gap in a restoration process according to this application.

Optionally, as shown in FIG. 19, in this application, the egress PE device #C may further shift information carried in a "D0" byte in the T6 code block to an "04" byte in the 0x2d code block, may shift information carried in a "D1" byte in the T6 code block to a "D5" byte in the 0x2d code block, may shift information carried in a "D2" byte in the T6 code block to a "D6" byte in the 0x2d code block, and may shift information carried in a "D3" byte in the T6 code block to a "D7" byte in the 0x2d code block.

In addition, the egress PE device #C may further fill a specified bit in "C0", "C1", "C2", and "C03" bytes in the 0x2d code block that are generated based on the foregoing modification.

As an example instead of a limitation, the T code block #b may be a T7 code block, to be specific, the T code block #b may be a code block in which information corresponding to a code block type field is "0xFF".

Because a quantity of bytes that can be used to carry data in the T7 code block is relatively large, modifying the 0x55 code block to the T7 code block can ensure that information in a modified code block is not lost, thereby further improving an effect of this application.

It should be understood that a specific example of the listed T code block #b is merely an example for description, and this application is not limited thereto. The T code block #b may be any one of T0 to T7 code blocks, provided that it is ensured that the T code block #a is different from the T code block #b.

Figure 20:
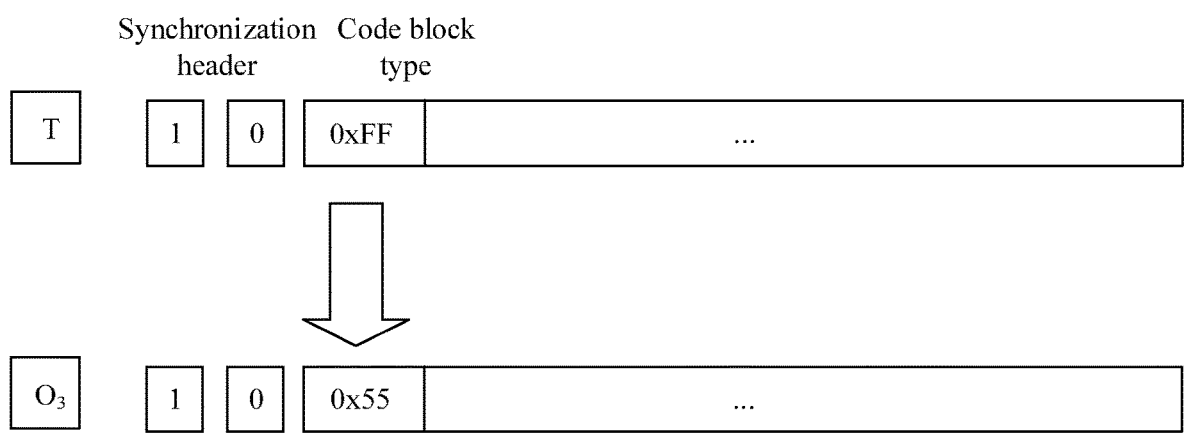
FIG. 20 is a schematic diagram of yet another example of a change of a T code block located in an inter-frame gap in a restoration process according to this application.

FIG. 20 is a schematic diagram of a change of the T7 code block in a modification process of Manner b. As shown in FIG. 20, the egress PE device #C may modify the information carried in the code block type field of the T7 code block from "0xFF" to "0x55".

It should be noted that the mapping relationship #A may be determined by a management device in the transport network and delivered to each transport device, or the mapping relationship #A may be specified in a communications system or a communications protocol in advance, or the mapping relationship #A may be determined through negotiation between the ingress PE and the egress PE, or the mapping relationship #A may be entered by a user or an administrator to the ingress PE and the egress PE, or the mapping relationship #A may be configured on the ingress PE and the egress PE by a manufacturer or an operator. This is not specifically limited in this application.

Manner c

When the ingress PE device #B performs a modification in Manner c, the egress PE device #C may modify a D code block received in an inter-packet gap to the 0x2d code block, and modify a T code block received in the inter-packet gap to the 0x55 code block.

Manner d

When the ingress PE device #B performs a modification in Manner c, the egress PE device #C may modify a D code block received in an inter-packet gap to the 0x55 code block, and modify a T code block received in the inter-packet gap to the 0x2d code block.

In Manner 3 and Manner 4, a modification process for each code block may be similar to a process described in Manner 1 or Manner 2. To avoid repetition, detailed descriptions are omitted herein.

It should be noted that in this application, because the egress PE device #C needs to restore the modified code block described above, a restoration manner used by the egress PE device #C needs to correspond to the modification manner used by the ingress PE device #B (for example, the restoration manner and the modification manner are processing mutually reverse to each other), so as to ensure accuracy of the restoration.

As an example instead of a limitation, in this application, the modification manner used by the ingress device #A may be specified in a communications system or a communications protocol in advance, or the modification manner used by the ingress device #A may be determined through negotiation between the egress PE device #C and the ingress PE device #B, or the modification manner used by the ingress device #A may be determined by the management device of the transport network and delivered to the ingress PE device #B, and the management device may deliver the restoration manner corresponding to the modification manner to the egress PE device #C.

In S260, the egress PE device #C may send, to a client device #D, a signal (which is denoted as an Ethernet signal #C) that is generated after the foregoing restoration processing, so that the client device #D can obtain, based on the Ethernet signal #C, various information carried in the Ethernet signal #A.

According to the solution provided in this application, a process of converting an O code block from a medium-low-speed Ethernet signal into a high-speed Ethernet signal can be completed without loss of information. Complete codeword transparency can be implemented without loss of information in an original code block stream.

In addition, the foregoing code block conversion process has a transcoding efficiency of 1:1, no additional bit overheads are required, bandwidth expansion is not caused, and transmission resources are not wasted. It can be implemented that 5 G Ethernet (GE) occupies only one 5 G slot of the FlexE, 10 GE occupies only two 5 G slots of the FlexE, and 25 GE occupies only five 5 G slots of the FlexE.

The solution provided in this application can comply with existing PCS layer coding specifications of 10G BASE-R, 25G BASE-R, and 100G BASE-R, without affecting a standard code block processing mechanism (for example, an idle code block adjustment mechanism).

According to the solution provided in this application, an Ethernet signal (to be specific, the medium-low-speed Ethernet signal) from a client device can be transmitted in a codeword transparent manner in the transport network, where the codeword is a combination of a group of several bits of binary code, and the codeword transparency indicates that a transport network that carries and transports a user client signal does not lose or tamper with information of any codeword in a user client signal data stream when transmitting the data stream that carries the codeword.

Figure 21:
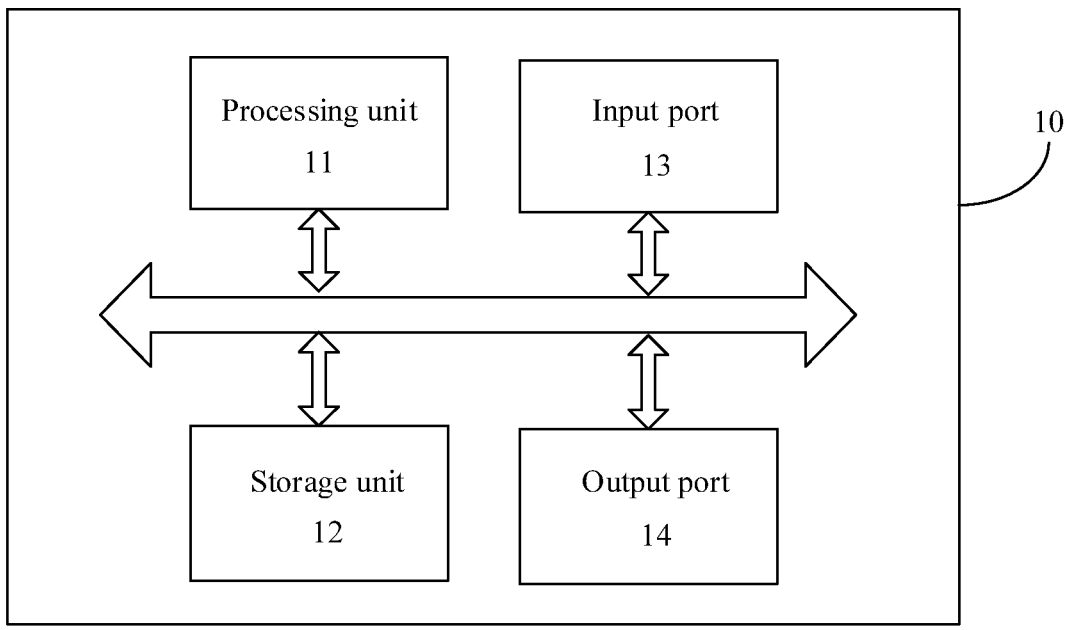
FIG. 21 is a schematic diagram of an apparatus sending a code block stream according to this application.

According to the foregoing method, FIG. 21 is a schematic diagram of a communications apparatus 10 according to an embodiment of this application. As shown in FIG. 21, the apparatus 10 may be an ingress transport device (a receiving device, for example, an egress PE device), or may be a chip or a circuit, for example, a chip or a circuit that can be disposed in an ingress transport device.

The communications apparatus 10 may include a processing unit 11 (an example of a processing unit) and a storage unit 12. The storage unit 12 is configured to store an instruction, and the processing unit 11 is configured to execute the instruction stored in the storage unit 12, so that the communications apparatus 10 implements steps performed by a transport device (a receiving device, for example, the egress PE device #C) in the foregoing method.

Further, the apparatus 10 may include an input port 13 (an example of a communications unit) and an output port 14 (another example of the communications unit). Further, the processing unit 11, the storage unit 12, the input port 13, and the output port 14 may communicate with each other by using an internal connection path, to transmit a control and/or data signal. The storage unit 12 is configured to store a computer program. The processing unit 11 may be configured to invoke the computer program from the storage unit 12 and run the computer program, to control the input port 13 to receive a signal, and control the output port 14 to send a signal, so as to implement the steps performed by the terminal device in the foregoing method. The storage unit 12 may be integrated into the processing unit 11, or the storage unit 12 and the processing unit 11 may be separately disposed.

Optionally, if the communications apparatus 10 is a transport device, the input port 13 is a receiver, and the output port 14 is a transmitter. The receiver and the transmitter may be a same physical entity or different physical entities. When the receiver and the transmitter are a same physical entity, the receiver and the transmitter may be collectively referred to as a transceiver.

Optionally, if the communications apparatus 10 is a chip or a circuit, the input port 13 is an input interface, and the output port 14 is an output interface.

In an implementation, it may be considered that functions of the input port 13 and the output port 14 are implemented by using a transceiver circuit or a dedicated transceiver chip. It may be considered that the processing unit 11 is implemented by using a dedicated processing chip, a processing circuit, or a processing unit, or a general-purpose chip.

In another implementation, it may be considered that a general-purpose computer is used to implement the receiving device provided in this embodiment of this application. In other words, program code for implementing functions of the processing unit 11, the input port 13, and the output port 14 is stored in the storage unit 12, and a general-purpose processing unit executes the code in the storage unit 12 to implement the functions of the processing unit 11, the input port 13, and the output port 14.

In an implementation, the input port 13 is configured to receive, from a transport network, a code block stream that is in a first rate mode and that includes a plurality of code blocks, the processing unit 11 is configured to determine a target code block from the code block stream, where the target code block is a code block received by the receiving device in an inter-packet gap of the code block stream, the target code block includes a first target code block, and the first target code block is a code block of a data type, and/or the target code block includes a second target code block, and the second target code block is a code block of a termination type, and the processing unit 11 is configured to modify the target code block to modify the target code block to a code block, of an ordered set type, that is in a second rate mode, where a rate corresponding to the second rate mode is less than a rate corresponding to the first rate mode.

Optionally, the processing unit 11 is configured to determine a termination location of the inter-packet gap based on a code block of a start type in the code block stream, and determine a start location of the inter-packet gap based on a code block of the termination type in the code block stream.

Optionally, the processing unit 11 is configured to determine the start location of the inter-packet gap based on a code block of a first termination type in the code block stream, where the code block of the first termination type is a first code block that is of the termination type and that is located after the code block of the start type in a transmission sequence.

Optionally, the processing unit 11 is configured to modify information carried in a synchronization header field of the first target code block to synchronization header information corresponding to the ordered set type, and/or modify information carried in a code block type field of the second target code block to code block type information corresponding to the ordered set type.

Optionally, the processing unit 11 is configured to modify, based on a mapping relationship, information carried in a code block type field of a second target code block of the first termination type to information corresponding to a first ordered set type, where the mapping relationship is used to indicate a one-to-one mapping relationship between at least two termination types and at least two ordered set types, and the first ordered set type.

The foregoing listed functions and actions of modules or units in the apparatus 10 are merely an example for description. The modules or units in the apparatus 10 may be configured to perform actions or processing processes performed by the transport device (for example, the egress PE device #C) in the foregoing method. To avoid repetition, detailed descriptions are omitted herein.

For concepts, explanation, detailed descriptions, and other steps that are related to the technical solution provided in this embodiment of this application and that are related to the apparatus 10, refer to description about the content in the foregoing method or other embodiments. Details are not described herein again.

Because the code block of the ordered set type is transmitted in the inter-packet gap, a sending device may modify the code block of the ordered set type to the code block of the data type or the code block of the termination type that can be recognized by the transport network. In this way, the receiving device can determine that the code block of the data type or the code block of the termination type that is located in the inter-packet gap is modified based on the code block of the ordered set type, and may further modify the code block of the data type or the code block of the termination type that is located in the inter-packet gap back to the code block of the ordered set type. This can not only ensure that the code block of the ordered set type can be transmitted by using the transport network, but also ensure that the receiving device reliably recognizes the code block of the ordered set type, thereby improving communication accuracy.

Figure 22:
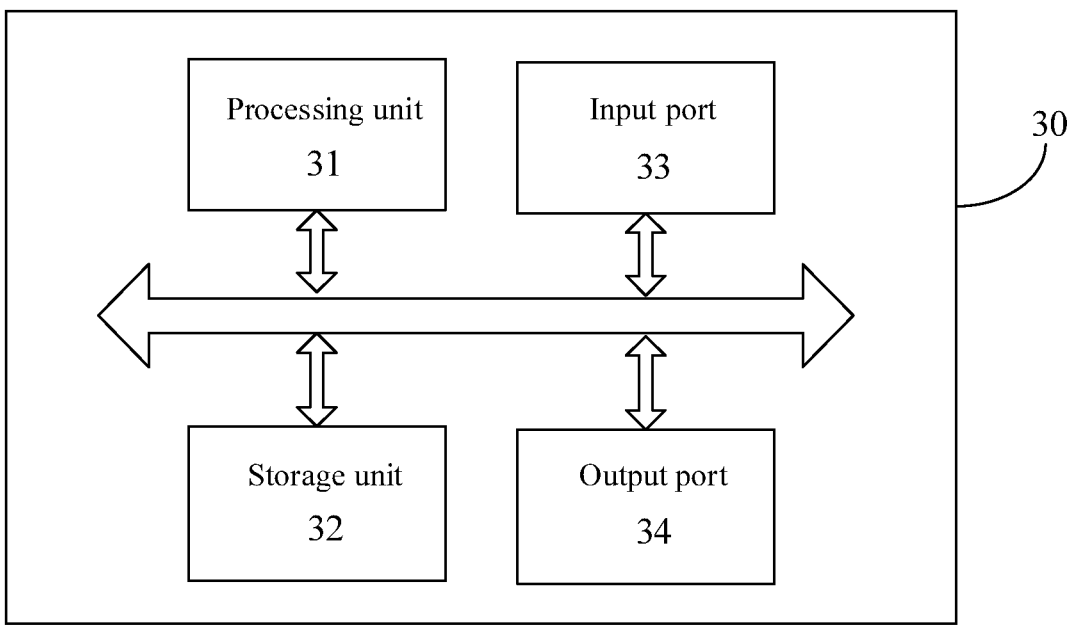
FIG. 22 is a schematic diagram of an apparatus receiving a code block stream according to this application.

According to the foregoing method, FIG. 22 is a schematic diagram of a communications apparatus 30 according to an embodiment of this application. As shown in FIG. 22, the apparatus 30 may be a transport device (a sending device, for example, an ingress PE device #B), or may be a chip or a circuit, for example, a chip or a circuit that can be disposed in a network device.

The apparatus 30 may include a processing unit 31 and a storage unit 32. The storage unit 32 is configured to store an instruction, and the processing unit 31 is configured to execute the instruction stored in the storage unit 32, so that the apparatus 30 implements steps performed by a sending device in the foregoing method.

Further, the apparatus 30 may further include an input port 33 (an example of a communications unit) and an output port 33 (another example of the processing unit).

Still further, the processing unit 31, the storage unit 32, the input port 33, and the output port 34 may communicate with each other by using an internal connection path, to transmit a control and/or data signal.

In addition, it may be considered that a general-purpose computer is used to implement the network device provided in this embodiment of this application. In other words, program code for implementing functions of the processing unit 31, the input port 33, and the output port 34 is stored in the storage unit, and a general-purpose processing unit executes the code in the storage unit to implement the functions of the processing unit 31, the input port 33, and the output port 34.

The storage unit 32 is configured to store a computer program.

In an implementation, the processing unit 31 may be configured to invoke the computer program from the storage unit 32 and run the computer program, to determine a code block stream in a first rate mode based on a code block stream of a plurality of code blocks that is in a second rate mode, where a rate corresponding to the second rate mode is less than a rate corresponding to the first rate mode, a code block of an ordered set type in the code block stream in the second rate mode is modified to a code block of a data type, and/or a code block of an ordered set type in the code block stream in the second rate mode is modified to a code block of a termination type, and the output port 34 is configured to send the code block stream in the first rate mode to a transport network.

Optionally, information carried in a synchronization header field of the code block of the ordered set type is modified to synchronization header information corresponding to the data type.

Optionally, information carried in a code block type field of the code block of the ordered set type is modified to code block type information corresponding to the termination type.

Optionally, the processing unit 31 is configured to modify, based on a mapping relationship, information carried in a code block type field of a code block of a first ordered set type to information corresponding to a first termination type, where the mapping relationship is used to indicate a one-to-one mapping relationship between at least two termination types and at least two ordered set types, the first ordered set type corresponds to the first termination type, and the first ordered set type is any one of the at least two ordered set types.

The foregoing listed functions and actions of modules or units in the apparatus 30 are merely an example for description. The modules or units in the apparatus 30 may be configured to perform actions or processing processes performed by the transport device (the sending device, for example, the ingress PE device #B) in the foregoing method. To avoid repetition, detailed descriptions are omitted herein.

For concepts, explanation, detailed descriptions, and other steps that are related to the technical solution provided in this embodiment of this application and that are related to the apparatus 30, refer to description about the content in the foregoing method or other embodiments. Details are not described herein again.

Because the code block of the ordered set type is transmitted in the inter-packet gap, the sending device may modify the code block of the ordered set type to the code block of the data type or the code block of the termination type that can be recognized by the transport network. In this way, a receiving device can determine that the code block of the data type or the code block of the termination type that is located in the inter-packet gap is modified based on the code block of the ordered set type, and may further modify the code block of the data type or the code block of the termination type that is located in the inter-packet gap back to the code block of the ordered set type. This can not only ensure that the code block of the ordered set type can be transmitted by using the transport network, but also ensure that the receiving device reliably recognizes the code block of the ordered set type, thereby improving communication accuracy.

Figure 23:
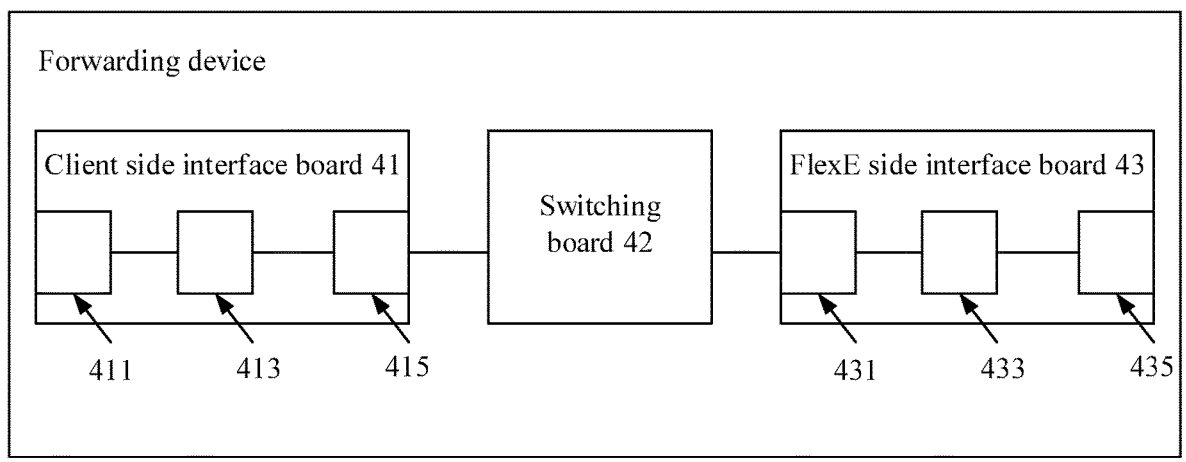
FIG. 23 is a schematic structural diagram of an example of a transport device according to this application.

FIG. 23 is a schematic block diagram of an example of a transport device (for example, an ingress transport device or an egress transport device) according to this application.

As shown in FIG. 23, the transport device includes one or more client side interface boards 41, a switching board 42, and one or more FlexE side interface boards 43.

The client side interface board 41 includes an external interface 411, a transcoder 413, and an internal interface 415.

In addition, the FlexE side interface board 43 includes an internal interface 431, a transcoder 433, and an external interface 435.

When the transport device serves as an ingress PE device the external interface 411 is configured to receive a low-speed Ethernet signal (for example, a signal at a rate of 5 Gbps, 10 Gbps, or 25 Gbps) from a client device, the transcoder 413 is configured to convert the low-speed Ethernet signal into a high-speed Ethernet signal (for example, a signal with a rate of 40 Gbps, 100 Gbps, 200 Gbps, or 400 Gbps), where the transcoder 413 is specifically configured to convert a code block in a PCS layer code block stream of the medium-low-speed Ethernet signal into a code block stream that meets a PCS layer transmission requirement of the high-speed Ethernet signal, the internal interface 415 is configured to send the high-speed Ethernet signal to the switching board 42, the switching board 42 is configured to forward, according to a preset routing rule, the high-speed Ethernet signal to the FlexE side interface board 43 that can route the high-speed Ethernet signal to the egress transport device, the internal interface 431 is configured to receive the high-speed Ethernet signal from the switching board 42, and the external interface 435 is configured to send the high-speed Ethernet signal to a transport network, for example, a FlexE network.

When the transport device serves as an egress PE device the external interface 435 is configured to receive a high-speed Ethernet signal (for example, a signal at a rate of 40 Gbps, 100 Gbps, 200 Gbps, or 400 Gbps) from a transport network, for example, a FlexE network, the transcoder 433 is configured to convert the high-speed Ethernet signal into a medium-low-speed Ethernet signal (for example, a signal with a rate of 5 Gbps, 10 Gbps, 25 Gbps, or 400 Gbps), where the transcoder 433 is specifically configured to convert a code block in a PCS layer code block stream of the high-speed Ethernet signal into a code block stream that meets a PCS layer transmission requirement of the medium-low-speed Ethernet signal, the internal interface 431 is configured to send the medium-low-speed Ethernet signal to the switching board 42, the switching board 42 is configured to forward, according to a preset routing rule, the mediumlow-speed Ethernet signal to the client side interface board 41 that can route the medium-low-speed Ethernet signal to a destination client device, the internal interface 415 is configured to receive the medium-low-speed Ethernet signal from the switching board 42, and the external interface 411 is configured to send the medium-low-speed Ethernet signal to the destination client device.

When the transport device serves as the ingress PE device, an action of the client side interface board 41 (specifically, each module or unit in the client side interface board 41) may correspond to an action of the input port 13, and an action of the transcoder 413 may correspond to an action of the processing unit 11. To avoid repetition, detailed descriptions are omitted herein.

For example, a forwarder may modify information carried in a synchronization header field of a code block of an ordered set type in a code block in a PCS layer code block stream of an Ethernet signal to synchronization header information corresponding to a data type.

For another example, the forwarder may modify information carried in a code block type field of the code block of the ordered set type in the code block in the PCS layer code block stream of the Ethernet signal to code block type information corresponding to a termination type.

Specifically, the forwarder may modify, based on a mapping relationship, information carried in a code block type field of a code block of a first ordered set type to information corresponding to a first termination type, where the mapping relationship is used to indicate a one-to-one mapping relationship between at least two termination types and at least two ordered set types, the first ordered set type corresponds to the first termination type, and the first ordered set type is any one of the at least two ordered set types.

In addition, when the transport device serves as the egress PE device, an action of the FlexE side interface board 43 (specifically, each module or unit in the FlexE side interface board 43) may correspond to an action of the output port 34, and an action of the transcoder 433 may correspond to an action of the processing unit 31. To avoid repetition, detailed descriptions are omitted herein.

For example, the transcoder may determine a termination location of an inter-packet gap based on a code block of a start type in the code block stream, and determine a start location of the inter-packet gap based on a code block of the termination type in the code block stream.

Specifically, the forwarder may determine the start location of the inter-packet gap based on a code block of a first termination type in the code block stream, where the code block of the first termination type is a first code block that is of the termination type and that is located after the code block of the start type in a transmission sequence.

For another example, the transcoder may modify information carried in a synchronization header field of a first target code block to synchronization header information corresponding to the ordered set type.

For another example, the transcoder may modify information carried in a code block type field of a second target code block to code block type information corresponding to the ordered set type.

Specifically, the forwarder may modify, based on the mapping relationship, information carried in a code block type field of a second target code block of the first termination type to information corresponding to the first ordered set type, where the mapping relationship is used to indicate a one-to-one mapping relationship between at least two termination types and at least two ordered set types, the first ordered set type corresponds to the first termination type, and the first termination type is any one of the at least two termination types.

In this application, the code block in the PCS layer code block stream of the Ethernet signal may include a 64b/66b code block.

As an example instead of a limitation, a code block of the ordered set type in the PCS layer code block stream of the medium-low-speed Ethernet signal includes a code block in which information carried in a code block type field is 0x2d or 0x55.

In this application, the forwarder (inflow, the transcoder 413 or transcoder 433) may be implemented by a processor. The processor is mainly configured to process a communications protocol and communication data, control the entire transport device, execute a software program, and process data of the software program, for example, configured to support the transport device in performing the action described in the foregoing method embodiment. A memory is mainly configured to store a software program and data.

After a terminal device is powered on, the processor may read a software program in a storage unit, explain and execute an instruction of the software program, and process data of the software program.

For example, the processor may include a baseband processor and a central processing unit (CPU). The baseband processor is mainly configured to process a communications protocol and communication data, and the CPU is mainly configured to control the entire terminal device, execute a software program, and process data of the software program. A person skilled in the art may understand that the baseband processor and the CPU may be processors independent of each other and are interconnected by using technologies such as a bus. A person skilled in the art may understand that the terminal device may include a plurality of baseband processors to adapt to different network standards, the terminal device may include a plurality of CPUs to enhance a processing capability of the terminal device, and components of the terminal device may be connected by using various buses. The baseband processor may also be expressed as a baseband processing circuit or a baseband processing chip. The CPU may also be expressed as a central processing circuit or a central processing chip. A function of processing a communications protocol and communication data may be embedded into the processor, or may be stored in a storage unit in a form of a software program, so that the processor executes the software program to implement a baseband processing function.

It should be understood that, the processor in the embodiments of this application may be a CPU, or may be another general-purpose processor, a digital signal processor (DSP), an application-specific integrated circuit (ASIC), a field-programmable gate array (FPGA) or another programmable logic device, a discrete gate or a transistor logic device, a discrete hardware component, or the like. The general-purpose processor may be a microprocessor, or the processor may be any conventional processor or the like.

It should also be understood that the memory in the embodiments of this application may be a volatile memory or a nonvolatile memory, or may include a volatile memory and a nonvolatile memory. The nonvolatile memory may be a ROM, a programmable read-only memory (PROM), an erasable programmable read-only memory (EPROM), an electrically erasable programmable read-only memory (EEPROM), or a flash memory. The volatile memory may be a random-access memory (RAM) that is used as an external cache. By way of example but not limitation, many forms of RAM may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DR RAM).

All or some of the foregoing embodiments may be implemented by using software, hardware, firmware, or any combination thereof. When software is used to implement the embodiments, the foregoing embodiments may be all or partially implemented in a form of a computer program product. The computer program product includes one or more computer instructions or computer programs. When the computer instructions or the computer programs are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), or a semiconductor medium. The semiconductor medium may be a solid-state drive.

It should be understood that the term "and/or" in this specification describes only an association relationship for describing associated objects and represents that three relationships may exist. For example, A and/or B may represent the following three cases only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application. It may be clearly understood by a person skilled in the art that, for the purpose of convenient and brief description, for a detailed working process of the foregoing system, apparatus, and unit, refer to a corresponding process in the foregoing method embodiments, and details are not described herein again. In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments. In addition, functional units in the embodiments of this application may be integrated into one processing unit, or each of the units may exist alone physically, or two or more units are integrated into one unit. When the functions are implemented in the form of a software functional unit and sold or used as an independent product, the functions may be stored in a computer-readable storage medium. Based on such an understanding, the technical solutions of this application essentially, or the part contributing to other approaches, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a Universal Serial Bus (USB) flash drive, a removable hard disk, a ROM, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method implemented by a first device, wherein the method comprises:
   receiving, from a second device that is in a transport network, a first code block stream that comprises a plurality of code blocks and that is in a first Ethernet physical interface rate mode corresponding to a first rate;
   determining a termination location of an inter-packet gap of the first code block stream based on a second code block of a start type in the first code block stream;
   determining a start location of the inter-packet gap based on a third code block of a first termination type in the first code block stream, wherein the third code block is after a fourth code block of the start type in a transmission sequence;

determining a first target code block from the inter-packet gap, wherein the first target code block is of a data type or is of the first termination type;

providing a second code block stream by modifying the first target code block to a first code block that is of a first ordered set type and that is in a second Ethernet physical interface rate mode corresponding to a second rate that is lower than the first rate; and transmitting the second code block stream to a third device using the second Ethernet physical interface rate mode.

2. The method of claim 1, further comprising modifying first information in a synchronization header field of the first target code block to synchronization header information corresponding to the first ordered set type or modifying second information in a code block type field of the first target code block to code block type information corresponding to the first ordered set type.

3. The method of claim 2, wherein the first target code block is of the first termination type, wherein modifying the second information in the code block type field of the first target code block to the code block type information corresponding to the first ordered set type comprises modifying the second information to the code block type information based on a mapping relationship that indicates a one-to-one mapping relationship between at least two termination types and at least two ordered set types, wherein the first ordered set type is one of the at least two ordered set types and corresponds to the first termination type, and wherein the first termination type is any of the at least two termination types.

4. The method of claim 1, wherein the second Ethernet physical interface rate mode is a 5 gigabits per second (Gbps) mode, a 10 Gbps mode, or a 25 Gbps mode, and wherein the first Ethernet physical interface rate mode is a 40 Gbps mode, a 100 Gbps mode, a 200 Gbps mode, or a 400 Gbps mode.

5. The method of claim 1, wherein the first code block comprises a 64-bit/66-bit code block.

6. The method of claim 1, wherein the first code block comprises a code block type field with a value of 0x2d or 0x55.

7. A code block stream sending method implemented by an ingress provider edge device, wherein the code block stream sending method comprises:

providing a second code block stream that is in a second Ethernet physical interface rate mode corresponding to a second rate by modifying a first code block that is included in a first code block stream of code blocks and that is a first ordered set type to a data type or a termination type, wherein the first code block stream is in a first Ethernet physical interface rate mode corresponding to a first rate that is different than the second rate; and sending, using the second Ethernet physical interface rate mode, the second code block stream to a receiving device in a transport network, wherein the receiving device is unable to recognize the first code block that is the first ordered set type.

8. The code block stream sending method of claim 7, wherein the first code block comprises a synchronization header field, wherein the synchronization header field comprises first information, and wherein the code block stream sending method further comprises modifying the first information to synchronization header information corresponding to the data type.

9. The code block stream sending method of claim 8, wherein the first code block is an 0x2d code block, and wherein modifying the first information to the synchronization header information comprises modifying information corresponding to a control type code block to information corresponding to a data type code block.

10. The code block stream sending method of claim 9, wherein the information corresponding to the control type code block is 10, and wherein the information corresponding to the data type code block is 01.

11. The code block stream sending method of claim 7, wherein the first code block comprises a code block type field, wherein the code block type field comprises first information, and wherein the code block stream sending method further comprises modifying the first information to code block type information corresponding to the termination type.

12. The code block stream sending method of claim 11, wherein the termination type is a first termination type, wherein the code block stream sending method further comprises modifying to the code block type information based on a mapping relationship that indicates a one-to-one mapping relationship between at least two termination types and at least two ordered set types, wherein the first ordered set type is one of the at least two ordered set types and corresponds to the first termination type, and wherein the first ordered set type is any one of the at least two ordered set types.

13. The code block stream sending method of claim 7, wherein the second Ethernet physical interface rate mode is a 5 gigabits per second (Gbps) mode, a 10 Gbps mode, or a 25 Gbps mode, and wherein the first Ethernet physical interface rate mode is a 40 Gbps mode, a 100 Gbps mode, a 200 Gbps mode, or a 400 Gbps mode.

14. The code block stream sending method of claim 7, wherein the first code block comprises a 64-bit/66-bit code block.

15. The code block stream sending method of claim 7, wherein the first code block comprises a second code block, wherein the second code block comprises a code block type field with a value of 0x2d or 0x55.

16. An apparatus, comprising:

a transceiver configured to receive, from a first device that is in a transport network, a first code block stream that comprises a plurality of code blocks and that is in a first Ethernet physical interface rate mode corresponding to a first rate; and a processor coupled to the transceiver and configured to:
determine a termination location of an inter-packet gap of the first code block stream based on a second code block of a start type in the first code block stream;
determine a start location of the inter-packet gap based on a third code block of a first termination type in the first code block stream, wherein the third code block is after a fourth code block of the start type in a transmission sequence;
determine a first target code block from the inter-packet gap, wherein the first target code block comprises a second target code block of a data type or a third target code block of the first termination type; and
provide a second code block stream by modifying the first target code block to a first code block that is of a first ordered set type and that is in a second Ethernet physical interface rate mode corresponding to a second rate that is lower than the first rate, wherein the transceiver is further configured to transmit the second code block stream to a second device using the second Ethernet physical interface rate mode.

17. The apparatus of claim 16, wherein the processor is configured to:
    modify first information in a synchronization header field of the second target code block to synchronization header information corresponding to the first ordered set type; or
    modify second information in a code block type field of the third target code block to code block type information corresponding to the first ordered set type.

18. The apparatus of claim 17, wherein the first target code block is of the first termination type, wherein the processor is configured to modify the second information in the code block type field of the first target code block to the code block type information corresponding to the first ordered set type by modifying the second information to the code block type information based on a mapping relationship that indicates a one-to-one mapping relationship between at least two termination types and at least two ordered set types, wherein the first ordered set type is one of the at least two ordered set types and corresponds to the first termination type, and wherein the first termination type is any of the at least two termination types.

19. The apparatus of claim 16, wherein the first target code block comprises a synchronization header field, and wherein the processor is further configured to modify the first target code block by modifying the synchronization header field from information corresponding to a data type code block to information corresponding to a control type code block.

20. The apparatus of claim 19, wherein the information corresponding to the data type code block is 01, and wherein the information corresponding to the control type code block is 10.

* * * * *